(12) United States Patent
Chen et al.

(10) Patent No.: US 8,782,771 B2
(45) Date of Patent: Jul. 15, 2014

(54) REAL-TIME INDUSTRIAL FIREWALL

(75) Inventors: Chao Chen, Shanghai (CN); Steven J. Scott, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1421 days.

(21) Appl. No.: 11/765,159

(22) Filed: Jun. 19, 2007

(65) Prior Publication Data
US 2008/0320582 A1     Dec. 25, 2008

(51) Int. Cl.
*H04L 29/06*     (2006.01)

(52) U.S. Cl.
CPC ............... *H04L 63/0263* (2013.01); *H04L 63/105* (2013.01)
USPC ............. 726/13; 726/11; 726/14; 726/15; 713/168; 713/169; 713/170; 713/171; 713/175

(58) Field of Classification Search
CPC ........................ H04L 43/0263; H04L 63/105
USPC ............................................. 726/13
See application file for complete search history.

(56) References Cited

U.S. PATENT DOCUMENTS

| | | | |
|---|---|---|---|
| 6,895,383 B2 * | 5/2005 | Heinrich | 705/7.28 |
| 7,072,987 B2 | 7/2006 | Jurisch et al. | |
| 7,523,314 B2 * | 4/2009 | Spies et al. | 713/176 |
| 2003/0058277 A1 * | 3/2003 | Bowman-Amuah | 345/765 |
| 2004/0250158 A1 * | 12/2004 | Le Pennec et al. | 714/4 |
| 2006/0067209 A1 | 3/2006 | Sheehan et al. | |

FOREIGN PATENT DOCUMENTS

WO    0102963 A1    1/2001

OTHER PUBLICATIONS

"The Industrial Ethernet Book", Enhancing Automation and Internet Connectivity, Issue 32:34, Published by GGH Marketing Communications Ltd, 11 pages, retrieved on Jun. 19, 2007.

Eric Byres, et al., NISCC Good Practice Guide on Firewall Deployment for SCADA and Process Control Networks, Revision No. 14, Feb. 15, 2005, 42 pages.

* cited by examiner

*Primary Examiner* — Longbit Chai
(74) *Attorney, Agent, or Firm* — Amin, Turocy & Watson, LLP

(57) ABSTRACT

Providing for employing a real time firewall to secure components of an automation control network from unauthorized communication to or from such components is disclosed herein. A monitoring component can inspect at least a portion of an instance of communication directed toward or originating from a component of the automation control network. Such inspection can, e.g., be a deep packet inspection based on information received from a communication request and/or response protocol. A filtering component can selectively admit or deny propagation of the instance of communication based on the inspection and a predetermined security criterion. In such a manner, the subject innovation can provide for limited access to network components from office network machines and for securing components of an automation control network from influence by unauthorized entities.

24 Claims, 24 Drawing Sheets

| MODULE NAME | I/Os | PARAMETERS |
|---|---|---|
| INTERFACE MODULE | DIAGNOSIS INFORMATION | BUS LENGTH (BOOL TYPE, TWO VALUES: 0/1 SMALLER/GREATER THAN 'Y') |
| | | SPEED SELECTION (BOOL TYPE, TWO VALUES: 0/1 SMALLER/GREATER THAN 'X') |
| DISCRETE INPUT MODULE | 2 DISCRETE INPUTS | |
| DISCRETE OUTPUT MODULE | 2 DISCRETE OUTPUTS | SUBSTITUTE VALUE BEHAVIOR WHEN BUS IS OFF (BOOL TYPE, TWO VALUES: 0/1 -> PRESET/KEEP LAST VALUE) |
| | | SUBSTITUTE VALUE FOR CHANNEL 0 (BOOL TYPE, TWO VALUES: 0, 1) |
| | | SUBSTITUTE VALUE FOR CHANNEL 1 (BOOL TYPE, TWO VALUES: 0, 1) |

FIG. 5

REAL-TIME INDUSTRIAL FIREWALL

BACKGROUND

Automation control devices can often be connected via an electronic communication networks that can coordinate such devices and deliver time-critical process commands. Due to technological advances in such networks and in computing technology in general, automated and semi-automated processes are able to run more efficiently than similar entities in the recent past. For example, office networks comprising human-machine interfaces (HMIs), such as computers and other programmable electronic controllers, can be largely separate from automation devices, being connected by only a single communication channel. Consequently, typical office network communication, e-mail, transfer of data files, manipulation of data files and/or sharing of data files for instance, can be isolated from a control network, such as a plant floor, manufacturing assembly line, or the like. Such isolation can further improve the communication capacity of intra-office and intra-control communication.

Imperfections associated with human action can be minimized through employment of precise machines as well. Many factories utilizing such devices supply data related to manufacturing to databases or web services referencing databases that are accessible by system/process/project managers. Such databases can be stored within or remote from the automation and control devices that typically generate such data, or a combination of both. For example, components of an automation control network can determine a frequency of performance, average power consumption, typical error information and rate, etc., associated with devices of the control network. In addition, the data provided by such components can be delivered to components of an alarm system, intended to notify system/process/project managers of issues that need to be addressed. Utilizing alarm systems, for instance, can further aid in fully automating and/or isolating automation control devices from officer HMI devices.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize an identity of a device when data is received and further deliver control data to an appropriate device.

As separation and human-initiated supervision of automation networks and devices increases, such networks and devices can increase process throughput while decreasing business overhead. More specifically, fewer employees must be maintained to supervise the actions of network devices. In addition, such devices and processes can be run with less downtime, effectively operating around the clock. As automation control networks have become more independent, additional research has been initiated to consolidate the interactions between HMI devices and automation devices and to help provide security for such interactions. Manufacturing and process entities that invest in automation networks and related equipment have a clear incentive to secure and advance the product of their investments.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Aspects of the claimed subject matter provide for employing an electronic communication firewall to secure components of an automation control network from unauthorized communication to or from such components. A monitoring component can inspect at least a portion of an instance of communication directed toward or originating from a component of the automation control network. Such inspection can, e.g., be a deep packet inspection based on information received from a communication request and/or response protocol. A filtering component can selectively admit or deny propagation of the instance of communication based on the inspection and a predetermined security criterion. In addition, the filtering component can base admission or denial of propagation on information specified in the communication request and/or response, if such request/response is compliant with the security criterion and suitably related to the instance of communication. In such a manner, the subject innovation can provide for limited access to network components from office network machines and for securing components of an automation control network from influence by unauthorized entities.

In accord with additional aspects of the claimed subject matter, a replication component can act as a communication proxy for data transfer between the automation control network, and/or components thereof, and external entities. The replication component can store information pertaining to automation control network components including, for instance, routing, addressing, name, and/or topology information, and provide such information to external components in response to an authorized request and/or response for communication. Moreover, a monitoring component can perform a deep packet inspection on a session of electronic communication related to the authorized request/response to determine whether information provided by the replication component is contained therein. An instance of communication containing such information can be propagated by a filtering component, whereas an instance of communication not containing such information can be denied propagation. In such a manner, aspects of the claimed subject matter can secure automation control devices from attempts to hack into the automation control network and from denial of service attacks by malicious sources.

In accord with further aspects of the claimed subject matter, a common interface is provided that can establish application-level relationships between devices external to and internal to an automation control network. Such relationships can act as a means for authorizing communication between a human machine interface (HMI) device and a component of the control network at an application level. Moreover, such communication can be authorized for all network devices, particular devices, or particular aspects of each device. More specifically, an external device can be given read only or read/write access to a single diagnostic, control, alarm, or like function of a single device, or combinations of such functions of one or more devices. Monitoring and filtering components can intercept a data packet inbound to or outbound from the control network, and deny or admit propagation of such packet based on the application-level relationships. In such a manner, the subject innovation provides for an efficient mechanism that can establish permissible interactions with components of an automation control network and can limit exposure of such components to un-permitted interaction.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

BRIEF DESCRIPTION OF THE DRAWINGS

FIG. 5 depicts example modules, parameters and input/output functions of an example I/O device.

DETAILED DESCRIPTION

Figure 1:
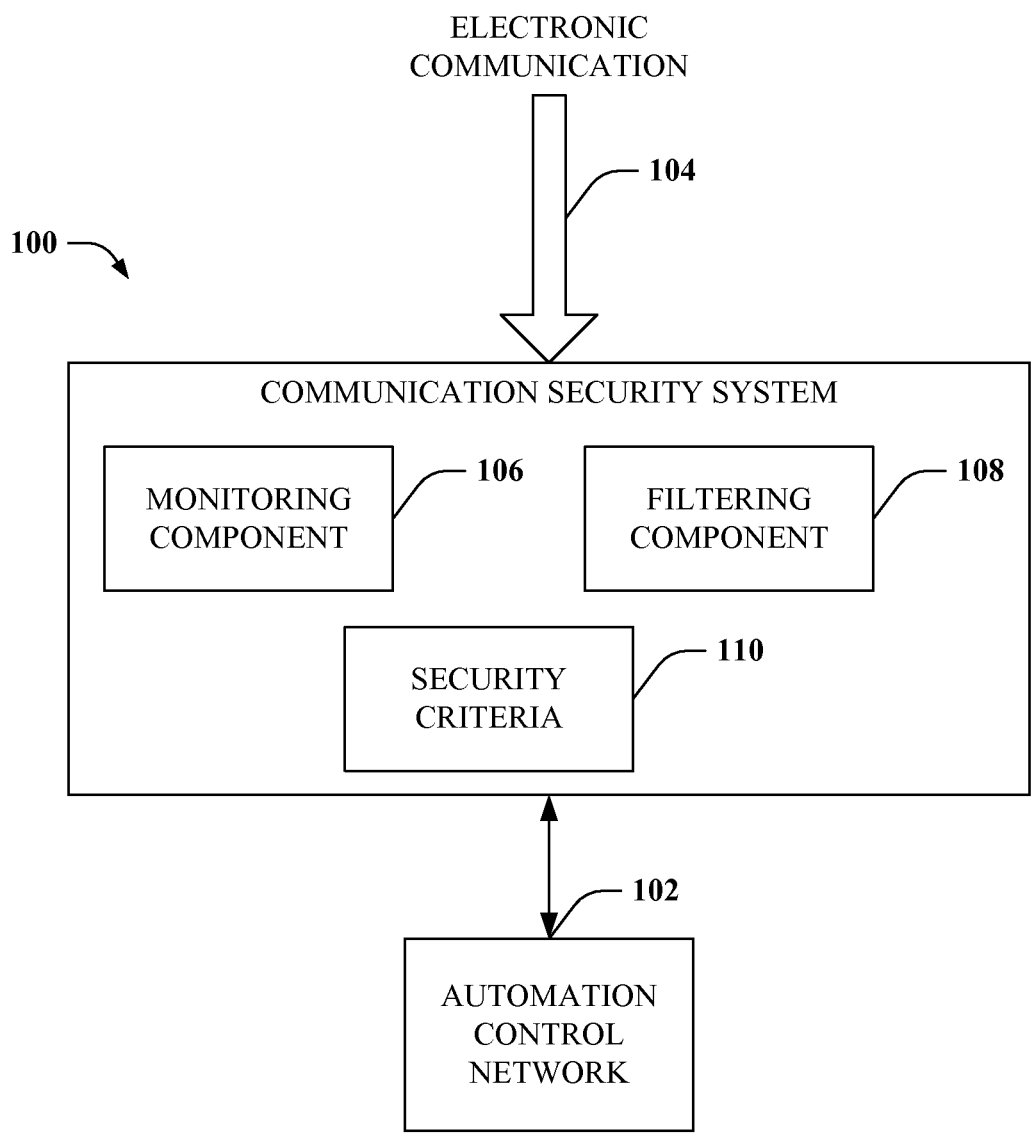
FIG. 1 depicts a high level block diagram of a communication security system for use in conjunction with an automation control environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As will be described in greater detail below, various embodiments provide for employing a real time firewall to monitor and filter electronic communication with and/or between components of an automation control network. Industrial automation has had an increasing dependence on information technology networks (e.g., Ethernet networks, and more specifically a PROFInet-type industrial control network) and computers, extending to the process and/or manufacturing device level. Threats to business continuity, such as viruses, worms, unauthorized casual or inadvertent access, hacker activity, or the like, possible through increased networking have consequently also expanded to devices on a shop floor, for instance. In particular, worms can present a costly non-directed threat by creating denial of service (DoS) in time critical network segments by their attempts to propagate.

In addition, non-automation personnel, such as IT programmers, can typically be required to have access to factory floor resources. For example, access can be for the purpose of creating ties to manufacturing execution systems (MES). However, such access by non-automation personnel can potentially lead to inadvertent access to unintended automation systems, and to subsequent safety hazards as a result. Typical IT path filtering is not suited to regulating such access since automation protocols (e.g., PROFInet-type protocols, and/or Ethernet automation protocols in general, or the like) are embedded into Internet protocol (IP) packets. Consequently, a need has arisen for securing and consolidating access to automation control equipment and/or networks to streamline efficiency and prevent potential electronic threats from an integrated office network.

With reference now to FIG. 1, a high level block diagram of a communication security system 100 for use in conjunction with an automation control environment (102) is depicted. The automation control network 102 can include one or more electronic devices (e.g., electronic drives, motors, logical controllers, supervising devices, human machine interface (HMI) devices, alarm components, display devices, robotic devices, or the like) communicatively coupled, such as by an Ethernet-type automation network. Such Ethernet-type automation network can utilize, for example, an integrated industrial communication protocol suitable for manufacturing and process automation (e.g., a PROFInet-type or similar automation control standard). Such a network can further enable homogeneous communication from a management level of a business entity to a field device level. As a further example, such Ethernet-type network can include a transmission control protocol (TCP)/IP communication standard, typical for Ethernet, Internet and Intranet-based networking, and further capable of integrating typical fieldbus systems.

Communication security system 100 can monitor electronic communication (e.g., data packets transmitted in accord with various suitable protocols, such as TCP/IP, or the like) inbound to, outbound from, or transmitted between components of automation control network 102. A monitoring component 106 can inspect at least a portion of an instance of electronic communication to or from, or both, automation control network 102. Monitoring component 106 can receive electronic communication 104 inbound to automation control network 102. An instance of electronic communication (104) (e.g., a data packet) can typically contain blocks of data including one or more headers (e.g., that can specify addressing, routing, length, type, and/or configuration information, as well as where a packet has been directed from, such as a media access control (MAC) address, IP address and/or port number of a sending and/or relaying device), a body containing instruction and/or diagnosis information or the like, and a trailer indicating an end of the instance of electronic communication (104). Electronic communication 104 can also include either a request or response protocol message appropriate for communication with the automation control network (e.g., compliant with an Ethernet, or specifically a PROFInet-type or like automation standard), or can include identification data associating it with a request or response message.

Monitoring component 106 can inspect any suitable portion of an instance of communication (104) including header, body, and trailer portions, or smaller portions thereof, to extract information pertinent to security criteria 110. Security criteria 110 can include, for instance, information related to authorized communication (e.g., devices external and/or internal to automation control network authorized to initiate, respond to, or both, communication with each other) such as a MAC address, IP address, port number or the like, of an authorized originating and receiving device, or combinations thereof. Security criteria 110 can also require an instance of communication (104) to include a request or response protocol message compliant with the information related to authorized communication, or include proper data associating it with a compliant request and/or response message. Accordingly, monitoring component 110 can inspect an instance of communication (104) for such information to facilitate a determination of whether such communication (104) is legitimate.

The following is a specific example to provide context for aspects of system 100 and should not be construed so as to limit the scope of the disclosure. A device external to automation control network 102 can be authorized to receive communication from an internal component (not depicted) of automation control network (102), respond to the internal component, but be restricted from initiating such communication. Security criteria 110 can, for instance, require a portion of data uniquely specified by the internal component (not depicted) for a particular session be included within any response by the external device. Any communication (104) by the external device failing to include such uniquely specified portion of data can be determined illegitimate. In such a manner, monitoring device 106 and security criteria 110 can facilitate detection of spoofing attacks, and assist in isolating automation control network 102 from such attacks.

In accord with additional aspects, communication security system 100 can reject or approve of packets to, from, and/or between automation control network 102 (and, e.g., components and devices thereof), thereby securing such network (102) from unauthorized and/or redundant communication (e.g., initiated by a hacking entity, virus, worm, trojan, spoofing attack, or by redundant communication from a formerly authorized device or communication session, or the like). Filtering component 108 can selectively admit or deny propagation of an instance of communication based on an inspection performed by the monitoring component 106, one or more predetermined security criterion (110), and/or information specified in a request or response communication compliant with security criteria 110. In such a manner, system 100 can create a security zone for an automation control network 102 sufficient for rigid security requirements typically required of such networks.

Figure 2:
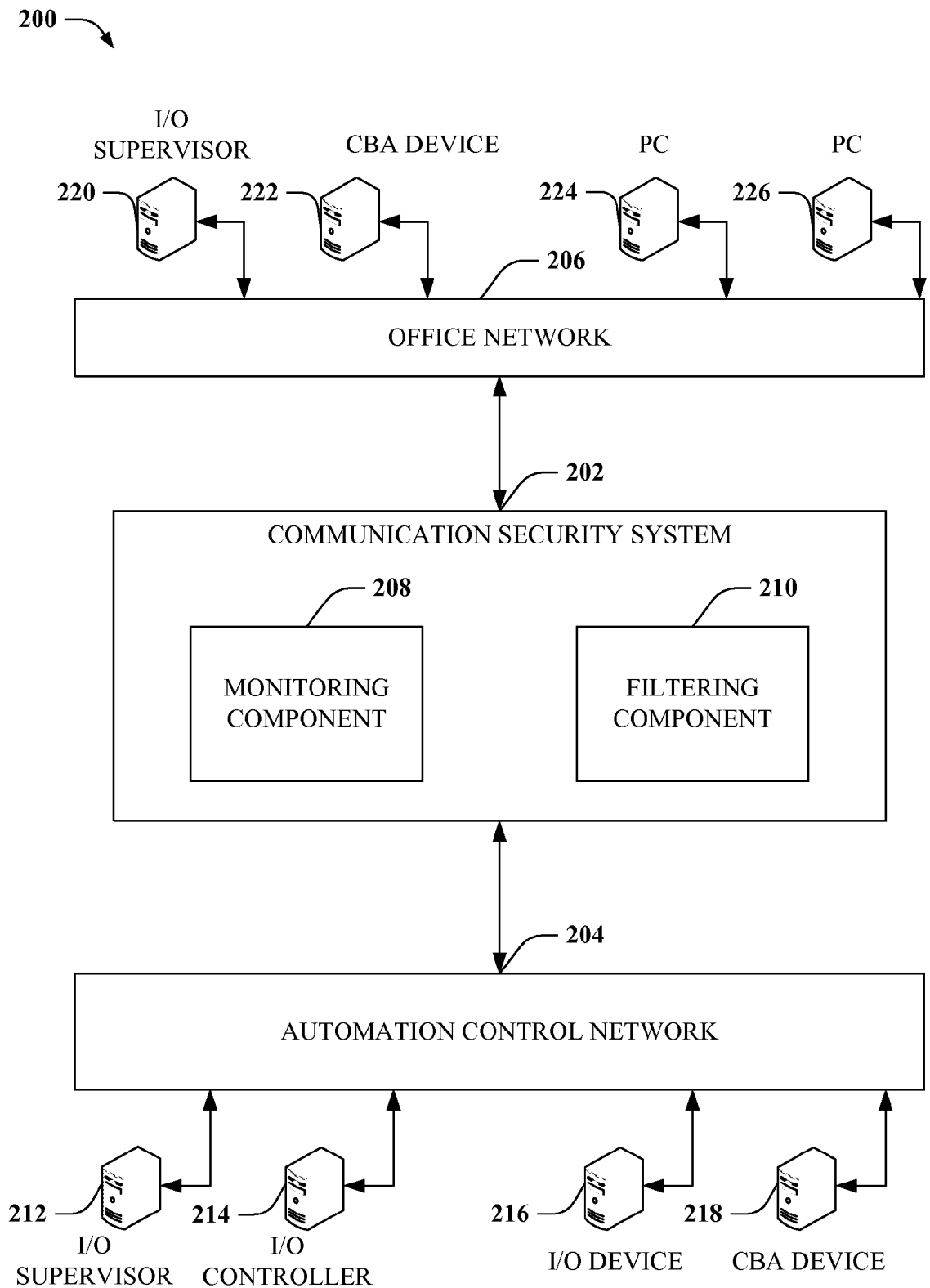
FIG. 2 illustrates an example block diagram of a communication security system in connection with an automation control environment and an office network.

FIG. 2 illustrates an example block diagram of a system 200 that can isolate an automation control network 204 and components thereof (212-218) from external networks (206). A communication security system 202 can be communicatively coupled so as to receive any suitable electronic communication inbound to and/or outbound from automation control network 204. More specifically, communication security system 202 can include monitoring and filtering components 208 and 210, respectively, which can inspect each inbound/outbound instance of communication and selectively reject or admit such communication based on the inspection, a predetermined security criterion, and/or an authorized request/response associated therewith. Automation control network 204 can be in accord with Ethernet-type or like network protocols capable of electronically coupling one or more automation devices (216,218), control devices (214), supervisor devices (212) or the like, and capable of receiving and transmitting communication from/to external networks. The PROFInet Ethernet protocol can be one such example.

PROFInet (and other Ethernet-type networks), for example, can include at least component based automation (CBA), or distributed automation, components (218, 222) as well as input/output (I/O), or decentralized periphery, components (212, 214, 216, 220). CBA specifications can typically provide advanced fieldbus application layer object models necessary for distributed automation between smart automation devices (218) having equal rights and having a facet for remote engineering of a system. I/O specifications can describe a device model that is based on features of a decentralized periphery and comprise slots, subslots, channels, and the like. More specifically, I/O specifications can utilize cyclic data transfer (e.g., periodic transfer of I/O device data inputs and outputs) and/or acyclic data transfer (e.g., a-periodic transfer of configuration and process commands, immediate transfer of alarm information, and the like) transmitted to a logic controller (214), or like device.

As depicted by FIG. 2, a communication security system 202 can be placed between an office network 206 and an automation control network 204 to protect the control network (204) and components thereof (e.g., plant floor automation devices, manufacturing shop automation devices, processing and/or fabrication motors, drives, controllers, robotics, etc.). Although a commercial firewall (not depicted) can be placed at a connection point(s) between office network 206 and exterior networks thereto (e.g., the Internet, external intranets, or the like), communications security system 202 can provide an increased level of security required by rigid requirements of time-critical electronic devices. Thus, automation control network 204 can be considered a security zone, where communication therewith is limited by communication security system 202 to eliminate unauthorized communication and/or redundant communication.

I/O control devices such as I/O controller 214 can perform cyclic and acyclic functions, and act as a client-type device for one or more field devices, such as I/O device 216. Cyclic functionality can include, for instance, exchange of IO data with I/O device(s) 216. Acyclic functionality can include, for instance, obtaining a diagnosis, providing configuration instructions, parameter data, dynamic reconfiguration, isochronous operation, and/or the like. I/O supervisors 212, 220 internal to and external to automation control network 204, respectively, can include engineering devices that manage, commission, and diagnose an I/O system (e.g., HMI and/or diagnosis devices, such as PCs 224 and 226). I/O supervisors 212, 220 can further provide configuration data (e.g., parameter sets) to and collect diagnosis data from I/O controller 214 and I/O device 216. I/O device 216 can be a field device that acts as a server for I/O operation and typically communicatively coupled with one or more I/O controllers 214. I/O device 216 can also perform cyclic functionality, such as exchanging I/O data with I/O controller 214 and/or related I/O devices (not depicted) as well as acyclic functionality such as providing diagnosis data, access to record data, alarms and alarm data, and treating parameters, configuration and diagnosis requests and alarms of various I/O components (212, 214, 220).

Cyclic and Acyclic communication to and from automation control network 204 can typically take one or more forms. TCP/UDP/IP transfer protocols can all be utilized for transfer of data to and from components (212-218) of control automation network 204. In addition, because TCP/IP is a standard in information technology (IT) data transfer, application protocols such as SMTP, FTP, HTTP, and the like can also be utilized for data transfer. Cyclic and acyclic real time communication channels can be established for time critical processes (e.g., a soft real time (SRT) channel, as utilized by PROFInet-type protocol for instance) and for highly demanding applications (e.g., an isochronous real time (IRT) channel, also typically utilized by PROFInet-type protocols), such as motion control. Such cyclic and acyclic channels can be on lower IEEE protocol layers and consequently require smaller data packets and less processing power, equating to faster transfer of payload information, than session establishment (e.g., typical communication request and/or response protocol packets) communication.

CBA devices 218 and 222 can include distributed automation systems and components distinguished by technological components and included within a modular plant, machine, factory, or the like, for instance. In addition, CBA devices 218,222 and components thereof can be modeled utilizing standardized component object modeling (COM) technology, a particular object oriented mapping concept that enables development of applications based on prefabricated components. One particular feature of CBA devices 218 and 222 is that they can form autonomous units and can further form relations with other components. For example, CBA devices 218 and 222, and components thereof, can be flexibly combined like building blocks and are easy to re-use, typically regardless of various internal implementations. Mechanisms for accessing CBA devices 218 and 222 can be uniformly defined by a particular Ethernet-type communication specification, such as TCP/IP, and/or user datagram protocol (UDP) or the like or combinations thereof.

Figure 3:
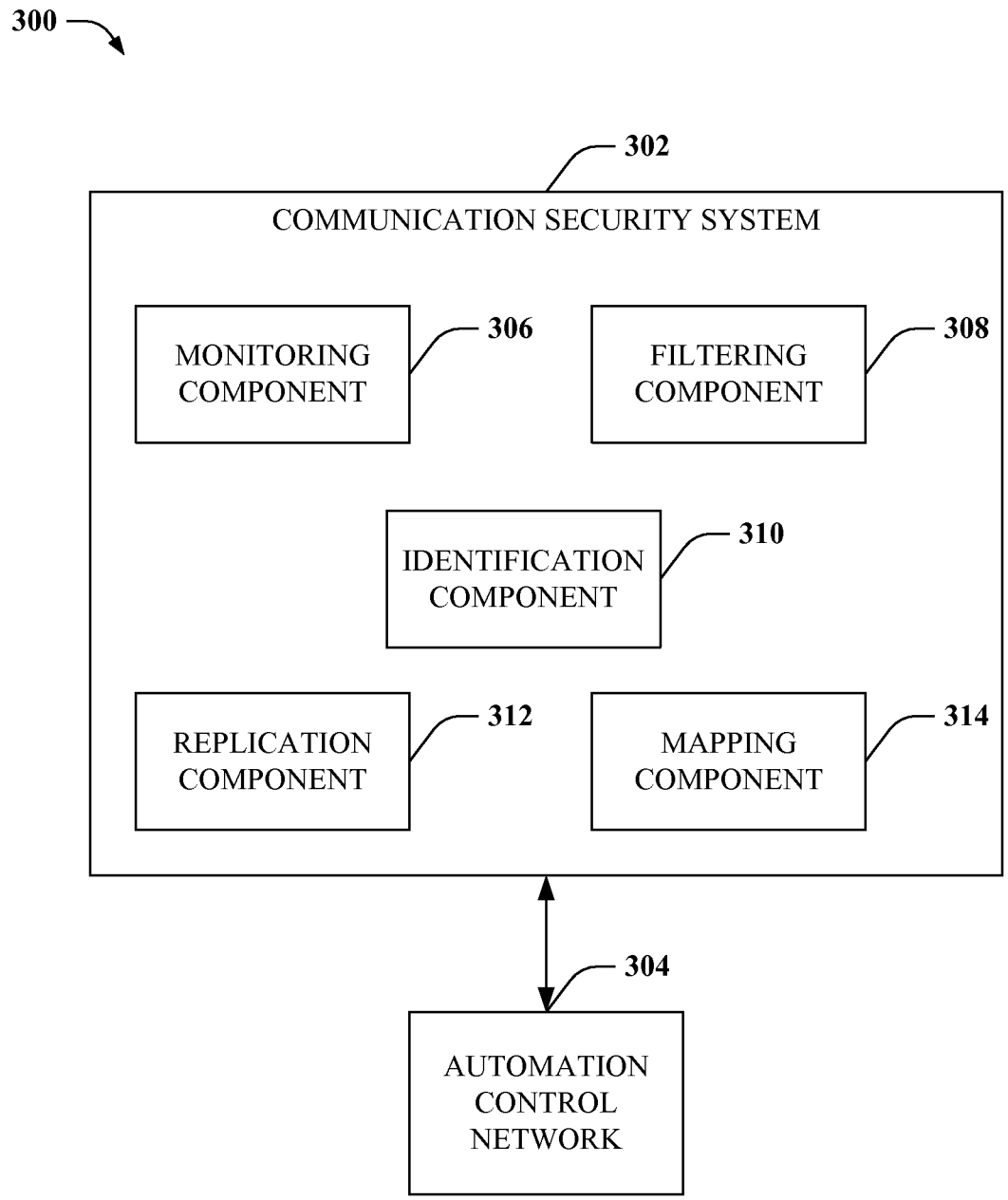
FIG. 3 depicts a sample block diagram of a communication security system that can act as an identity proxy for protected devices in accord with aspects of the claimed subject matter.

FIG. 3 depicts a sample block diagram of a communication security system (CSS) 302 that can act as an identity proxy for devices of an automation control network (ACN) 304 in accord with aspects of the claimed subject matter. More specifically, CSS 302 can request and receive basic configuration and discovery protocol communication (e.g., Device discovery and Configuration Protocol (DCP) utilized by PROFInet-type protocols) transmitted by devices external to and internal to automation control network 304, and block such communications from entering or leaving such network (304). The security system (302) can therefore restrict external devices from obtaining addressing and/or routing information directly from components of ACN (304). Instead, communication inbound/outbound to/from CAN 304 is directed to CSS 302 instead, which can then forward communication to appropriate internal/external systems.

Monitoring component 306 can inspect at least a portion of incoming/outgoing communication for compliance with one or more security criterion (not depicted). Such inspection can be based on a request and/or response communication (e.g., that attempts to establish an application relationship between an external and internal device as authorized by the security criterion), directed at CSS 302 to establish an application relationship and subsequent communication between at least one external and at least one internal device. If such request and/or response communication contains data in a manner specified by the one or more security criterion (e.g., MAC address, IP address, and/or port number of initiating and/or receiving devices that are properly designated as authorized to communicate, optionally in a particular direction, by the one or more security criterion), the communication can be determined a compliant communication. Subsequently, CSS 302 can forward the communication to an appropriate target device.

In addition, monitoring component 306 can inspect non-request/response instances of communication (e.g., that convey I/O and/or CBA device operation data to/from such devices) to determine whether a suitable relation to the compliant request/response communication exists. For instance, a deep packet inspection can be performed on a subsequent communication to determine whether data contained within the compliant communication is present, as required by the security criteria (e.g., MAC address, IP address, port number of an authorized initiating and/or receiving device, portion of a logical and/or topological classification of such device, or the like). Presence of such data can indicate that the subsequent communication is related to the compliant request/response, and therefore also compliant.

Monitoring component 306 can also identify a discovery and configuration request message inbound to and/or outbound from ACN 304. Typically, such messages will be restricted by filtering component 308 to prevent external devices from obtaining addressing information associated with ACN devices. Typical automation control networks have few if any restrictions to sending and replying to such messages. Consequently, a network threat (e.g., virus, worm, etc.) that penetrates an external firewall into an office network, can harm sensitive control processes as well via monitoring, replicating and issuing such discovery and configuration messages. By acting as a communication proxy CSS 302 can intercept such messages and/or responses, and only provide routing, addressing and like information to authorized devices.

A proper request and/or response communication can also specify session duration. Session duration can, for instance, establish one or more conditions (e.g., time, process completion, transfer of an established amount of data, and/or the like) for termination of a session. Once a session is terminated, subsequent communication containing information related to a compliant, yet terminated request/response communication can also be determined unauthorized. As a result, CSS 302 can protect ACN 304 from spoofing attacks that attempt to acquire and replicate information related to compliant communication.

Filtering component 308 can selectively deny or admit propagation of an instance of communication based on an inspection performed by monitoring component 306, one or more security criterion, and/or information specified in a request/response communication as specified above. Consequently, communication not in accord with a predetermined security criterion (e.g., establishing a right for two devices to communicate or communicate as to particular aspects, functions, operations etc. of one of the devices, or the like) can be terminated. Particularly, discovery and configuration messages, not initiated by components of CSS 302, can be blocked by filtering component 308. In such a manner, CSS 302 can restrict device identity, topology, routing, addressing and/or like information related to ACN 304 from leaving or entering ACN 304, in accord with one or more security criterion, for example.

CSS 302 can also include an identification component 310 that can broadcast a request for and receive a response to a discovery and configuration message (e.g., DCP message) and store information detailed therein. Such message can include information related to name, topology, addressing and/or routing associated with components of the automation control network and/or devices of an external network. In addition, identification component 310 can send and receive discovery and configuration messages periodically, to maintain a current list of connected devices and information associated with those devices. Subsequently, identification component 310 can provide stored information to replication component 312.

Replication component 312 can act as a communication proxy on behalf of ACN 304 and/or components thereof, to facilitate communication between external devices. Replication component 312 can receive discovery and configuration information associated with devices communicatively coupled with CSS 302 from identification component 310. If an external device requests information about a component of ACN 304, replication component can reference one or more security criterion (e.g., that establish permissible device communication), and if communication is authorized with such component, reply to the external device with a device name of the requested component. A device name can be correlated to routing information of a device (e.g., by mapping component 314), such that communication directed at replication component 312 specifying a target device name can be forwarded via standard TCP/IP mechanisms (e.g., forwarded to a MAC address, IP address, port number, and/or the like) to the target device (so long as such communication is not denied by filtering component 308 above, for instance).

Mapping component 314 can correlate addressing, routing, topology, control, and/or like information, or combinations thereof, associated with a component of the automation control network to a name associated with a device. Such correlation can facilitate routing an instance of communication to a component of the automation control network via the device name. In addition, correlation can enable data transfer between two devices via CSS 302 utilizing device name and/or topology information. Consequently, routing information (e.g., IP address) associated with one or more components of ACN 304 can be changed (or, e.g., assigned randomly) without disrupting legitimate traffic with ACN devices. Furthermore, mapping component 314 can facilitate establishment of access rules (e.g., specified by one or more security criterion and authorizing communication with one or more internal components of ACN 304) by way of device name and/or topology. In such a manner, creation of access rules in conjunction with CSS 302 can be relatively simple (e.g., see FIGS. 8-11, infra).

Figure 4:
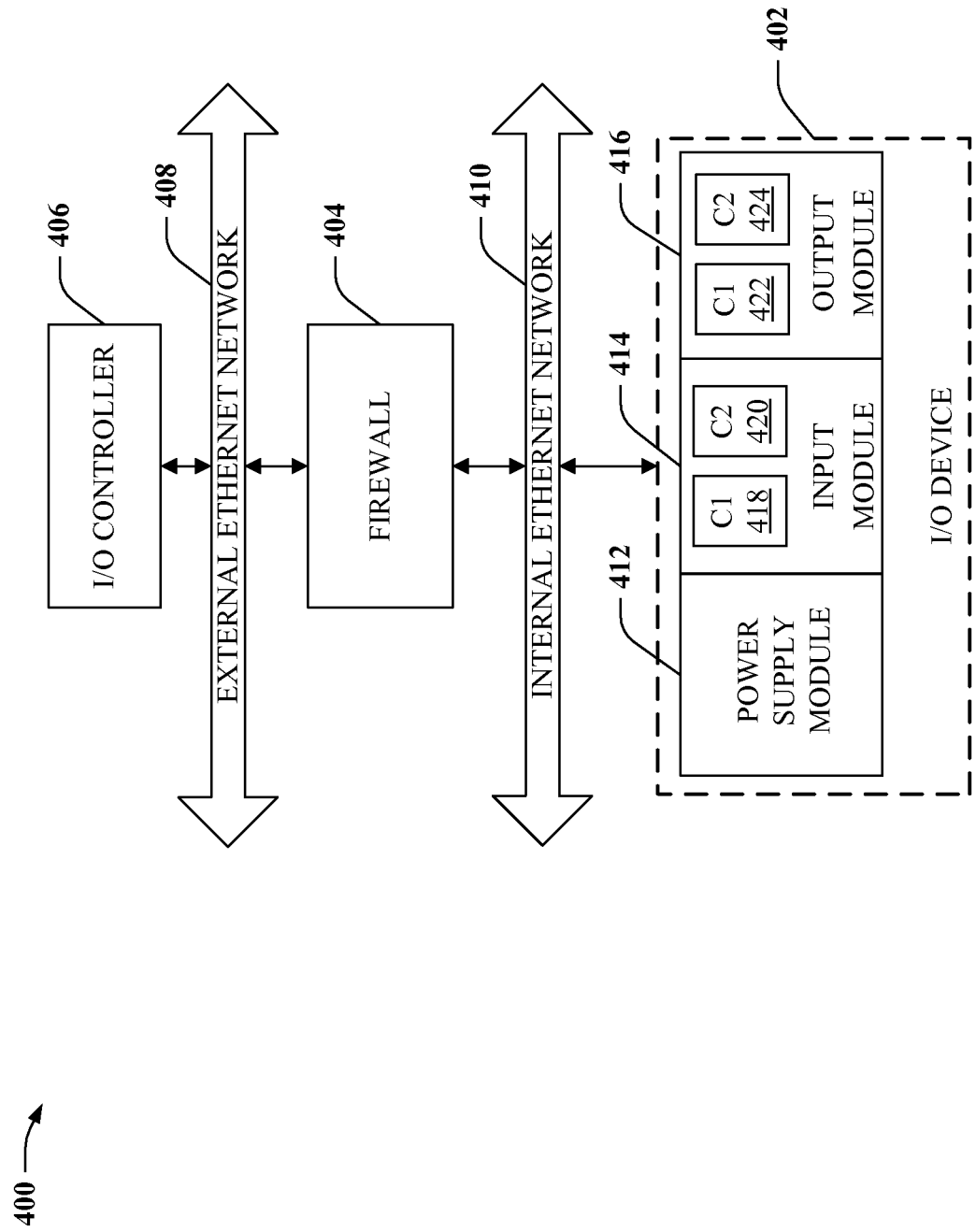
FIG. 4 illustrates an example input/output (I/O) device and industrial firewall in accord with aspects of the subject innovation.

FIGS. 4 and 5 illustrate an example relationship between devices external to and internal to an automation control network, where such network is protected by a real time industrial firewall. Specifically, FIG. 4 illustrates an example I/O device 402 and firewall 404 in accord with aspects of the subject innovation. I/O device 402 can be an automation control device utilized, for instance, in process, manufacturing, or like automation, as described supra. I/O controller 406 can provide configuration, and/or real-time process instructions to I/O device 402, as well as obtain diagnosis, alarm, and/or report information from such device (402). I/O controller 406 can also comprise or be coupled with an HMI device(s) (e.g., PCs depicted in FIG. 2 at 224 and 226) for input of specific instructions, parameters, or the like. I/O controller 406 can be coupled with other external devices and communicate with firewall 404 via an external Ethernet-type network 408. In addition, firewall 404 can communicate with field level devices (402) via internal Ethernet network 410 (e.g., a PROFInet-type automation control network).

I/O device 402 can perform and/or provide various functions, each of which can be controlled independently. Functions of I/O device 402 can be organized into a hierarchical topology (see, e.g., FIG. 6 for a detailed discussion of an example I/O device topology), where a single device can have multiple applications modules, each module can have multiple channels, and each channel can have multiple functions. More specifically, I/O device 402 has 3 modules, a power supply module 412, a discrete input module 414 having two channels 418, 420 (e.g., that can each act as discrete inputs), and a discrete output module 416 also having two channels 422, 424 (e.g., that can each act as discrete outputs).

Communication between I/O controller 406 and I/O device 402 can be monitored and filtered by firewall 404. For example, a security criterion can specify that I/O controller 406 is authorized to initiate communication with output module 416 only. Under such conditions, I/O device 402 cannot legitimately initiate communication with I/O controller 406, or legitimately respond to communication requests from IO controller 406 directed toward any module or channel other than output module 416. Firewall 404 can monitor an instance of communication between such devices, and discard all such instances not meeting the security criterion. In addition, firewall 404 can intercept discovery and configuration request messages directed to or from internal Ethernet network 410, as described supra, and respond to them if compliant with the security criterion (e.g., if a request is sent by I/O controller 406 and/or a response from output module 416 to I/O controller 406), and discard them if not.

FIG. 5 depicts an example table 500 indicating one or more module names 502 of an I/O device (402) and corresponding I/Os 504 and parameters 506 related thereto. Each module (508, 510, 512) can be associated with none, one, or more such I/Os 504 and parameters 506. Specifically, I/Os 504 can be employed by an automation control network (410) to exchange periodic data to and/or from an I/O device (402), and parameters can include data employed to configure an I/O device (402), module (412, 414, 416), channel (418-424), or the like. Such parameter data can be sent at non-periodic intervals (e.g., at the beginning of communication for initialization of a device, at the end of communication to facilitate termination, such as clearing memory, or at various times during data transfer to effectuate interfacing with I/O controllers (406), I/O supervisors, or the like).

Interface module 508 corresponds to diagnostic I/O functions, and 2 parameter functions, namely bus length and speed selection, each having a particular binary format and meaning. The two parameters can form a single access right record, specified by one or more security criterion for instance (see FIGS. 8-11 for a more detailed description of establishing security criteria), that can be assigned to a particular internal or external device. A firewall (404) could inspect for and admit a data packet sent by the assigned device specifying such parameters 506 for interface module 508. A packet sent by another device bearing such information can be discarded.

In addition, discrete input module 510 corresponds with two discrete input I/Os (or channels 418,420), and discrete output module 512 corresponds with two discrete output I/Os (or channels 422, 424) and three parameters: "Substitute value for channel when bus off", "substitute value for channel 0", substitute value for channel 1". Such parameters can also form a single access right record that can be assigned to a particular internal or external device. As depicted by FIGS. 4 and 5, devices (e.g., I/O device 402) can be analyzed as separate modules, channels, functions, etc., each having I/Os and/or parameters (and, e.g., other associated functions) that can be assigned to a particular device(s) by one or more security criterion, to eliminate non-authorized or redundant communication with such devices.

Figure 6:
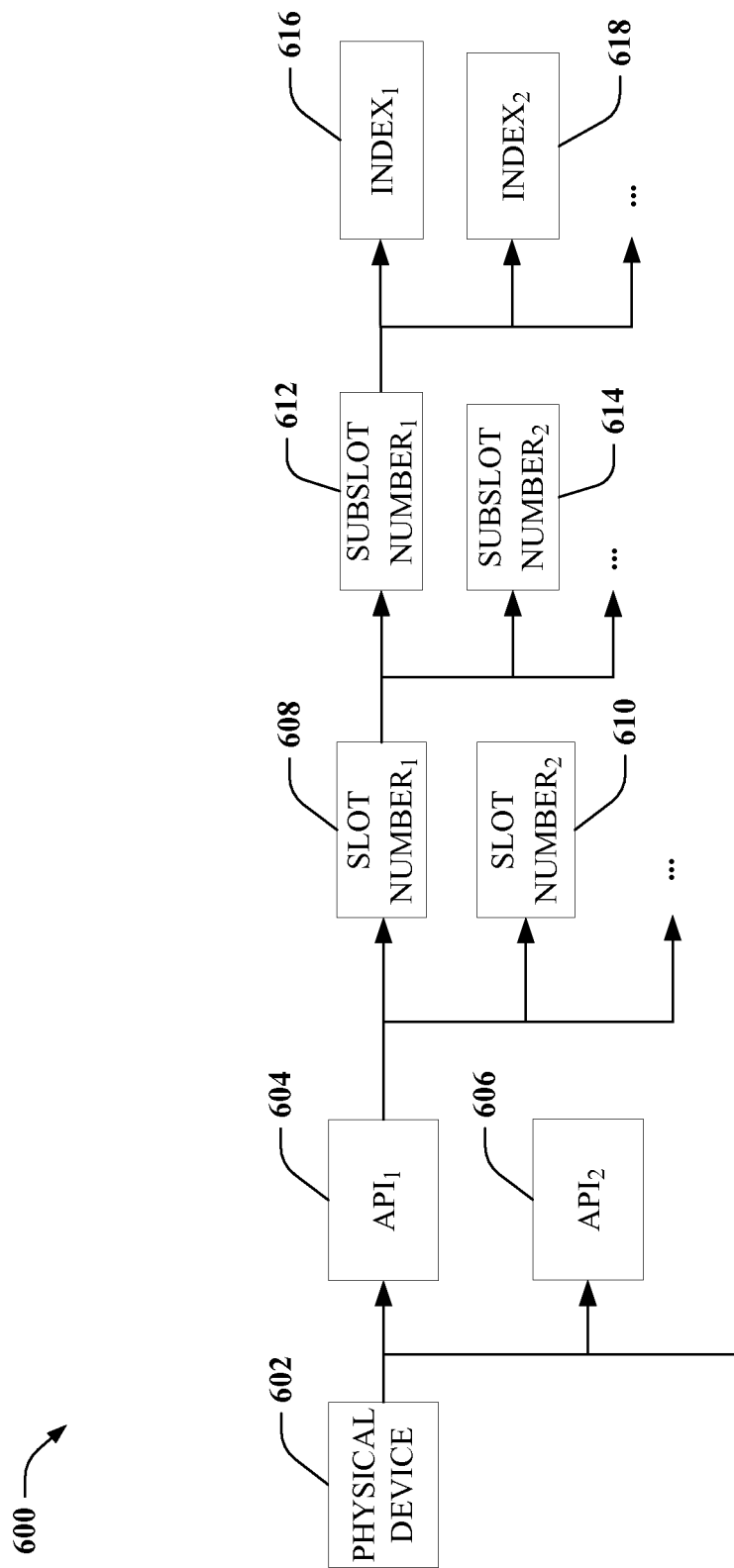
FIG. 6 illustrates an example topological structure of a sample I/O device in accord with aspects of the claimed subject matter.

FIG. 6 illustrates an example topological structure 600 of a sample I/O device in accord with aspects of the claimed subject matter. Each physical I/O device 602 can have a device name utilized to route communication to and from such device (602), for example, by way of a proxy and a correlation between the device name and MAC address, IP address, and/or port number(s) of such physical device 602 (e.g., as provided by replication component 312 and mapping component 314, supra). Each physical device can have one or more application processes (AP) represented by AP identifiers (APIs), such as $API_1$ 604 and $API_2$ 606. Each application process can have none, one, or more modules, represented by a slot, such as $slot_1$ 608 and $slot_2$ 610. As discussed supra, each module can have none, one, or more channels, represented by a subslot, such as $subslot_1$ 612 and $subslot_2$ 614. Additionally, each channel can be associated with none, one, or more access records (e.g., I/Os, parameters, or like device functions) represented by an index, such as $index_1$ 616 and $index_2$ 618.

As depicted, an I/O device is composed of different groups of application objects providing a certain, specified level of abstraction. The different groups may reflect hardware components or virtual function units of a field device. More specifically, the structural units can be referred to as slots, subslots, and channels that can correlate to physical units, subunits, or a single connection point of an I/O device, for instance. Consequently, such structural units represent the levels of abstraction of structural data associated with an I/O device. Channels may be further sub-divided into IO data objects (see, e.g., various Index fields corresponding to 10 data objects at 1012 of FIG. 10). Access rights to each record, channel, module, application process, and/or device can be established by authorizing access in accord with the object model: device name, API number, slot number, subslot number, index number. In such a manner, an I/O authorization interface can correlate authorized communications in a straightforward manner (e.g., see FIGS. 8-11 for more detail on authorizing access).

Figure 10:
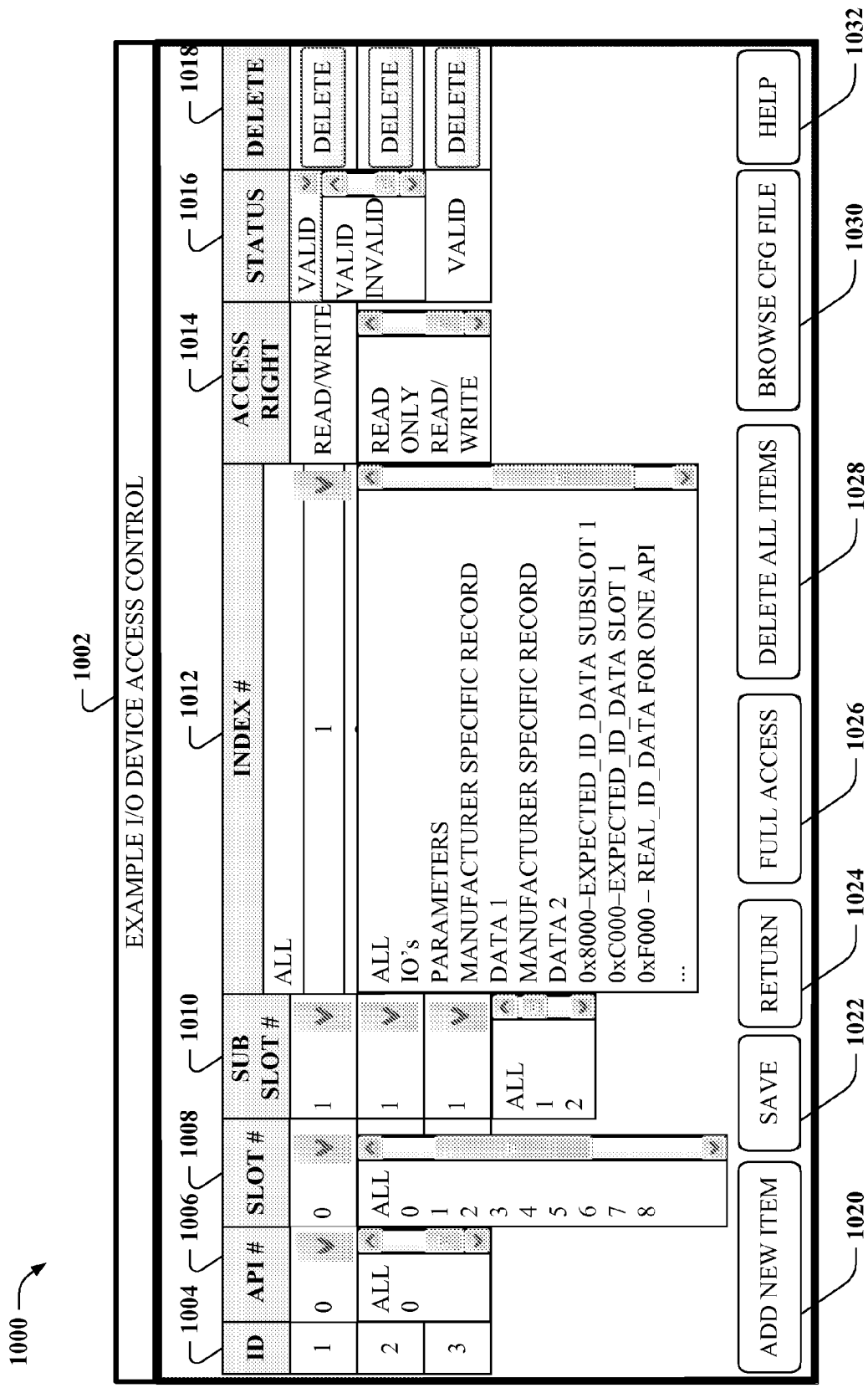
FIG. 10 depicts an example topology identification and assignment interface for an example I/O device in accord with aspects of the subject innovation.

PROFInet-type network protocols, for instance, arrange data into structural units as described above, and combine all parameters, I/Os, manufacturer specific record data having open semantics, and the like into a record data (see, e.g., index field 1012 of FIG. 10). As described, PROFInet-type specifications can address such record data by a slot number ranging from 0 to 0x7FFF, a subslot number ranging from 1 to 0x7FFF, and an index ranging from 0 to 0x7FFF. Furthermore, I/O data in one subslot can be combined into a data structure, which can be dependent on a generic device name or description, for instance. In addition, particular index entities can be assigned to particular ranges of address numbers. For example, the index range 0x8000 to 0xFFFF can be assigned to diagnosis information related to an I/O device, etc.

Figure 7:
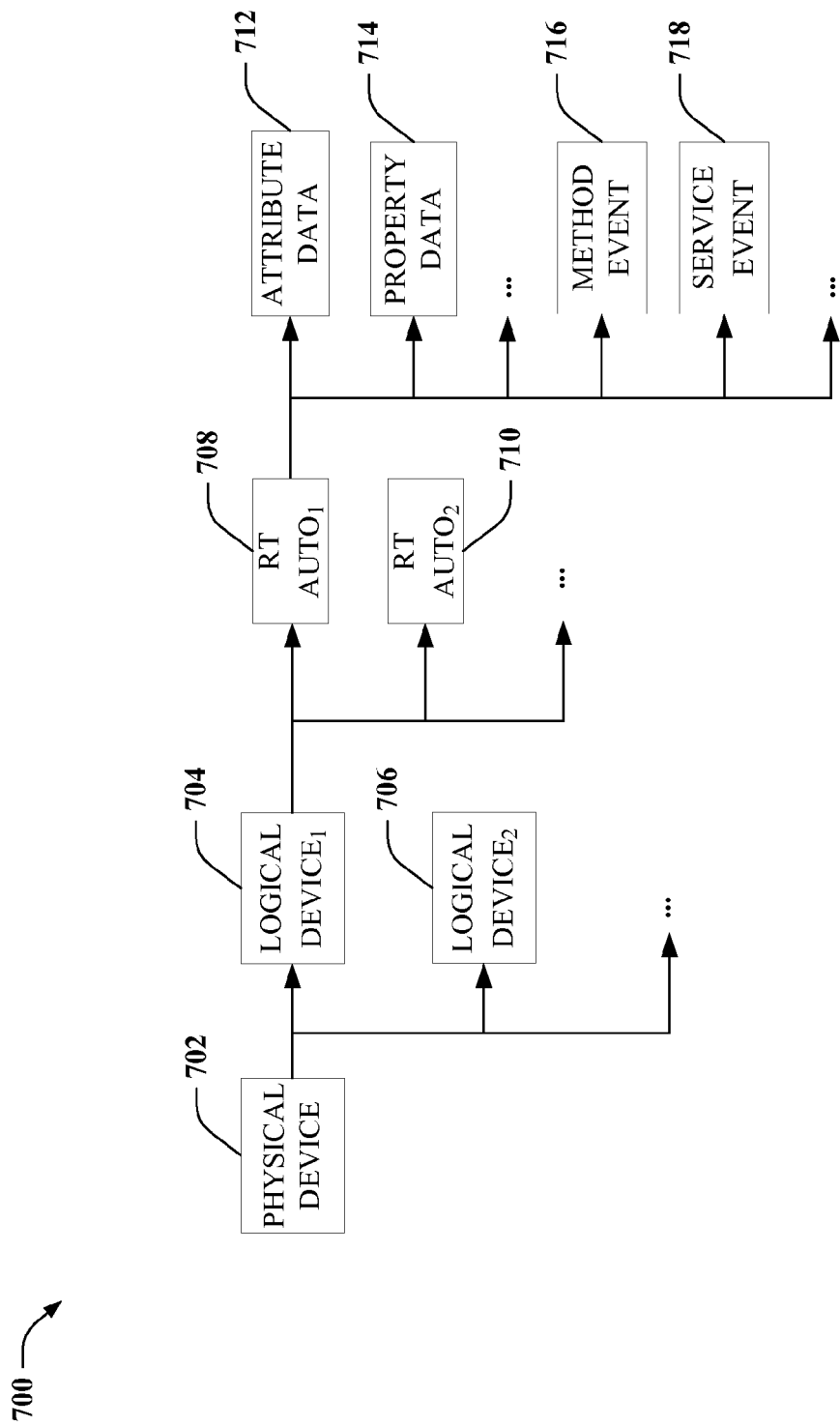
FIG. 7 illustrates an example topological structure of a sample component based automation (CBA) device in accord with aspects of the claimed subject matter.

FIG. 7 depicts an example topological structure 700 of a sample CBA device in accord with aspects of the claimed subject matter. A physical object 702, can typically have one or more logical objects 704, 706, each of which can typically have one or more real-time (RT) autos 708, 710, each of which can have one or more data/events (712-718). More specifically, data/events can include attribute data 712, property data 714, method events 716, and/or service events 718. Normally, a CBA device contains exactly one instance of a physical device (702) class (PDev), with one or more instances of a logical device (704, 706) class (LDev) per PDev instance, with one or more instances of an RT-auto (708, 710) class per LDev instance (704, 706). Access control of data (712, 714) and events (716, 718) of the RT-autos (708, 710) of the logical devices (704, 706) of a CBA device (702) can be defined in a firewall (404) with the address model: Physical device name, Logical device name, RT-Auto name and Data (Event) name.

A physical device 702 typically represents one physical hardware component, although multiple hardware components can be represented by such device (702). A logical device (704, 706) represents a software component or a firmware component as an autonomous self-contained unit. As a more specific example, a logical device can represent the functions of a physical device such as an actuator function, sensor function, controller function, or the like. An RT-auto (708, 710) can represent automation functionality in the form of a process related component. More specific examples can include, for instance, a boiler controller or the like. Data (712, 714) can represent both attributes (712) and properties (714) of an RT-auto object. Events (716, 718) can represent both methods (716) and services (718) of an RT-auto object.

Figure 11:
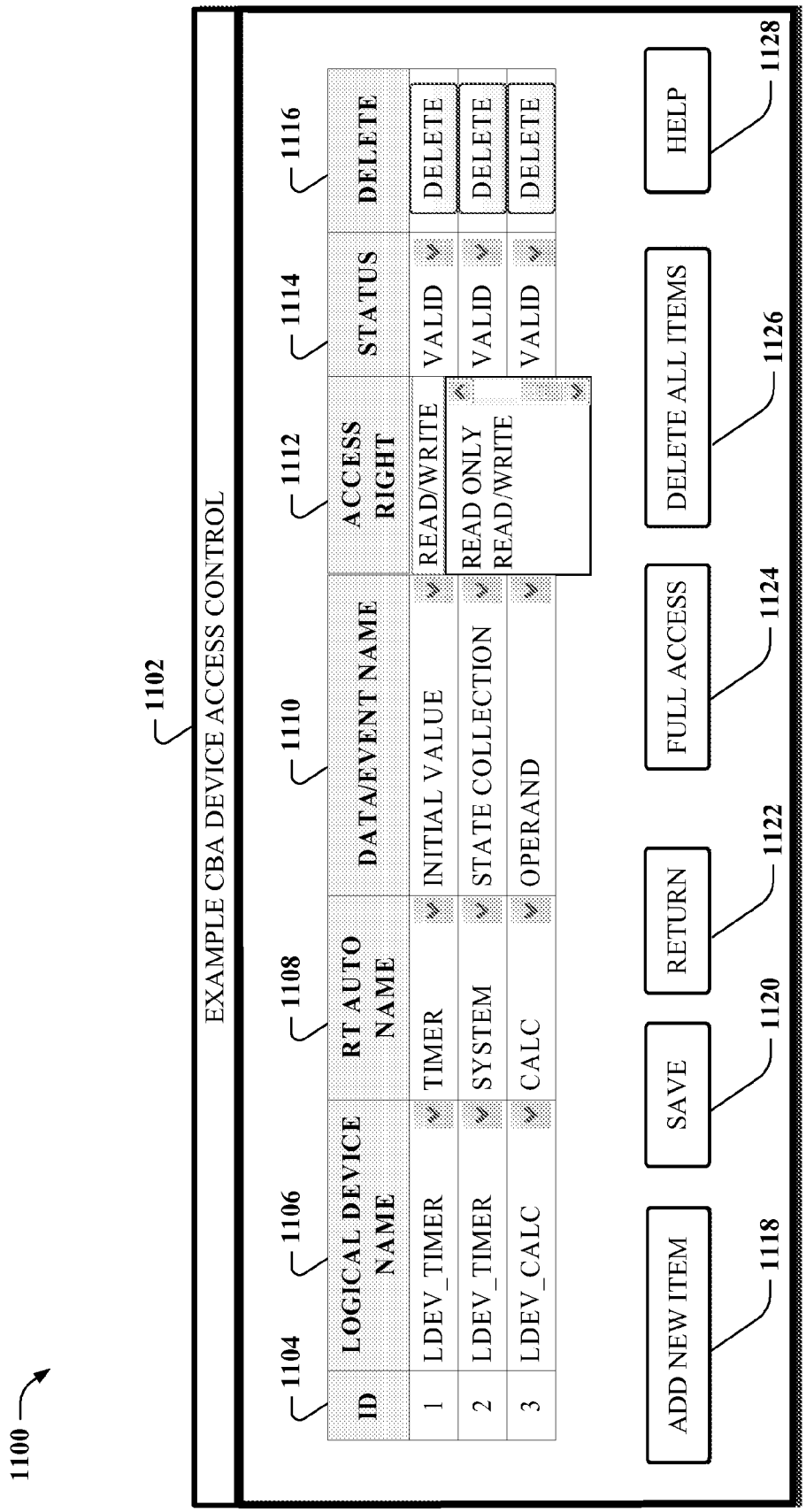
FIG. 11 illustrates a sample topology identification and assignment interface for an example CBA device in accord with aspects of the claimed subject matter.

A right to access/communicate with each data and/or event of one or more RT-autos, of one or more logical devices of one or more physical CBA devices can be assigned to another device via a firewall (404) interface (e.g., see FIG. 11, infra, for a more detailed discussion of a CBA assignment interface). Such assignment can constitute one or more communication security criterion utilized by the firewall to determine whether an instance of communication is legitimate or not. In such a manner, aspects of the claimed subject matter can assign access rights to specified devices to prevent unauthorized and/or redundant communication with components of a control network as described herein.

Figure 8:
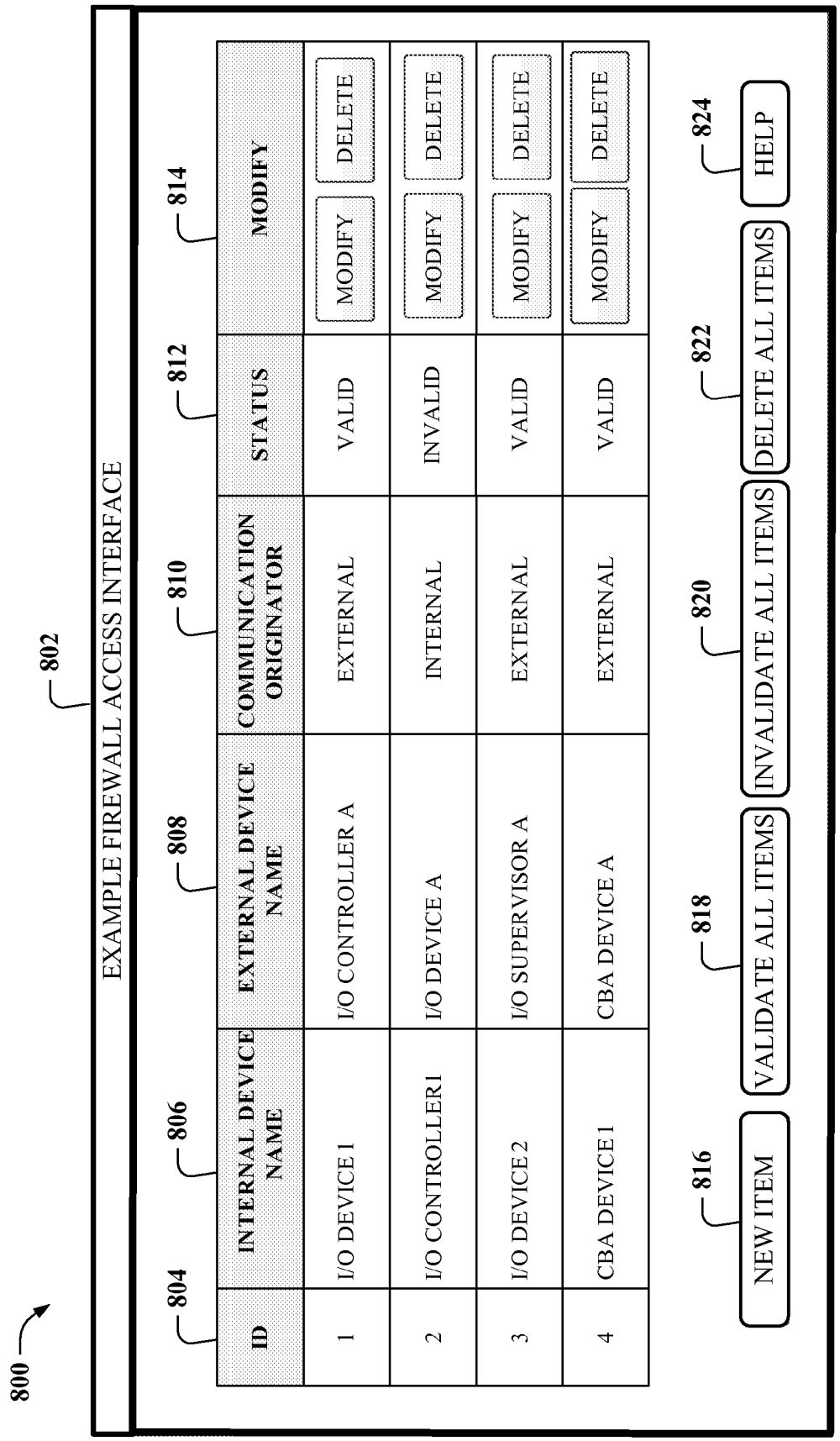
FIG. 8 depicts an example access interface for establishing permissible communication in accord with various aspects of the claimed subject matter.

FIG. 8 depicts an example interface 802 that can display established communication rules between components of an automation network in accord with various aspects of the claimed subject matter. Interface 802 can display application relationships between devices external to and internal to the automation network. Each ID number 804 indicates a particular communication filtering rule, or access right. Such rules utilize unique station/device names to identify an external or internal device. Routing information, such as MAC addresses, IP addresses, port numbers, etc., of devices need not be manually identified to establish such rules; components of a communication security system (302) (or firewall, for instance, 404) can correlate device names to routing information automatically.

Each ID number 804 indicates an internal device name 806, an external device name 808, and a communication originator 810 specifying direction specific application-level security criteria for each communication rule. A status flag 812 can also indicate whether a particular rule has been enabled or disabled, and a modification 814 flag can delete a particular rule, or bring up an additional interface (see e.g., FIGS. 9 and 10 for example modification interfaces) to modify specific details of such rule. Interface 802 can also include commands/icons/radio buttons or the like for creating a new rule (816), validating all rules (818), invalidating all rules (820), deleting all items (822), and accessing available help information (824).

Figure 9:
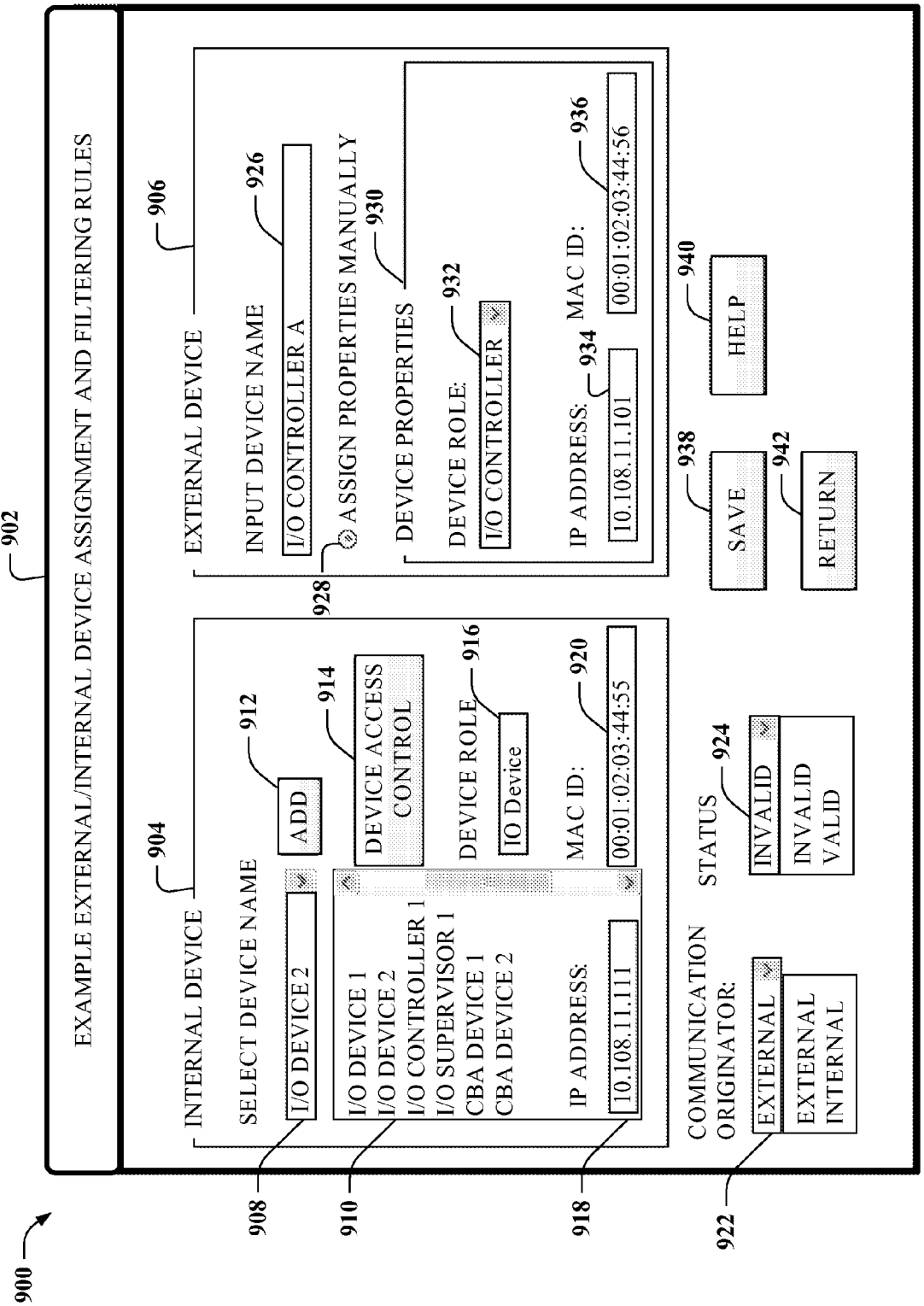
FIG. 9 illustrates an example device assignment interface for identifying devices, routing information associated therewith, and establishing communication access in accord with the subject disclosure.

FIG. 9 illustrates an example device assignment interface 902 for establishing communication access rules in accord with aspects of the subject disclosure. More specifically, internal and external devices can be selected for a rule, routing information associated therewith can be input and/or displayed, and directionality and status can be specified. Interface 902 exposes detailed information related to a single communication access rule. Such interface 902 can be activated by choosing a modify button of a modification (814) flag associated with the access rule on a device access interface (802), for instance.

Interface 902 can include an internal device field 904 and an external device field 906, each with a field for available internal (908) and external (926) devices and information associated with such devices. For example, a drop down box 910 can display a list of available internal automation network devices identified by a firewall in as described herein (e.g., by an identification component 310, supra). A name of a selected device can be displayed in an appropriate field 908. Additionally, the role, IP address, and MAC ID associated with such device can be automatically obtained (e.g., by an identification component 310, supra) and populated to the appropriate fields (916, 918, 920, respectively). An add button 912, or similar, can be activated to enter, select, indicate, or the like, (e.g., either manually and/or automatically as known in the art) a new device (e.g., not previously identified by identification component 310, or like mechanism). In addition, a device access control 914 button, or similar, can be activated to bring up an additional interface for assigning particular aspects of a selected internal device to the selected external device (926).

External device field 906 can include a field for the name of a selected external device 926 (input manually, or, e.g., auto-generated by components of an industrial firewall in accord with the subject disclosure), a radio button or the like automatically assigning properties to such a device manually 928 (determined, e.g., by an identification component 310, supra), and a related device properties field 930. The device properties field 930 can further display routing and like information associated with the external device, such as a role of the external device, IP address, and MAC ID of the device in appropriate fields (932, 934, and 936, respectively). Such routing information can be generated automatically by an industrial firewall as described herein, utilizing a DCP identify service, and/or domain name server (DNS) identify functions, or the like.

In addition, interface 902 can include a communication originator field 922 can establish whether the external device or the internal device must initiate communication for a communication session to be valid (and permitted by the firewall, for instance). In addition, a status field 924 can establish whether a particular access rule is valid at a particular point in time. Furthermore, interface 902 can include a save 938 button, or the like for storing a particular access right in memory, a help button 940, or the like for generating and displaying help information associated with interface 902, and a return button 942, or the like, for closing interface 902 and, for instance, bringing up an access right display interface, such as that depicted at 802 of FIG. 8.

FIG. 10 depicts an example topology identification and assignment interface 1002 for an example I/O device in accord with aspects of the subject innovation. Such an interface 1002 can be activated, for instance, by selecting an I/O device in a display field 910 for available internal devices, and selecting a device access control button 914 of a device assignment interface 902, as discussed supra. I/O device access control interface 1002 can assign access to particular portions, or all, of the functions of an I/O device associated with a particular access rule (as indicated at FIGS. 8 and 9, for instance). ID number 1004 indicates a particular assignment for the I/O device. Each particular assignment can specify one or all API's in an API field 1006, one or all slot numbers in a slot # field 1008, one or more subslot numbers in a subslot # field 1010, and one or all indexes of an index # field 1012. I/O devices can typically follow the object model depicted at FIG. 6, addressed by physical device name, API number, slot number, subslot number, and index number (see, e.g., 602, 604-606, 608-610, 612-614, and 616-618 at FIG. 6, respectively for more detail).

Examples of possible Index number fields associated with an API (1006), slot (1008), and/or subslot (1010) can include I/O data/fields, parameter data/fields, manufacturer-specific record data 1, manufacturer-specific record data 2, etc., expected ID data subslot 1 etc., expected ID data slot 1 etc., real ID data for one API, and the like. It should be appreciated that a firewall as described herein can obtain structure information related to functions and/or components of a device. For example, as depicted by FIG. 10, a configured device's hardware description file in a generic station description markup language (GSDML, a type of markup protocol for automation devices) can provide device structure information. In addition, a hardware configuration file exported from a network configuration tool can also provide device structure information of one or more devices.

As depicted in FIG. 10, accessing the various fields (1006, 1008, 1010, 1012) and selecting one or more available items contained therein can facilitate creation of access rules for a physical object in a straightforward and efficient manner. In addition, a read only or read/write access right for each rule (1004) can be specified by an access right field 1014. Such access right (1014) enables a device to view data associated with a record object (indicated by the index numbers 1012), or view and change such data, respectively. A status field 1016 can enable or disable each access rule, and a delete field 1018 can delete a particular rule. Moreover, interface 1002 can include commands for adding a new rule (1020), saving current access rules at the firewall memory (1022), returning to a previous interface (1024), providing full access to records and objects of a device (1026), deleting access rules (1028), browsing a CFG file (1030) to update the interface with device structure and object data information (e.g., from the hardware configuration file), and a help button 1032, or similar, to bring up instruction-related information associated with interface 1002.

FIG. 11 illustrates a sample topology identification and assignment interface 1102 for an example CBA device in accord with aspects of the claimed subject matter. Such an interface 1102 can be activated, for instance, by selecting a CBA device in a display field (910) for available internal devices, and selecting a device access control button (914) of a device assignment interface (902), as discussed supra. CBA device object model information such as logical device name 1106, RT-auto name 1108, and data/event name 1110 can be automatically populated to the respective fields (1106, 1108, 1110) by discovery and configuration protocol messages sent by the firewall in accord with various Ethernet-type protocol requirements.

An access rule to a particular data/event can be established by an ID number 1104 for a physical device, selecting one or all logical device names 1106, one or all RT-autos 1108, and one or all data/event names 1110. In addition, each access right can be specified as read only or read/write in an access right field 1112. Each access rule can be enabled or disabled by specifying its status in a status field 1114, and created access rules can be deleted as indicated at 1116. Furthermore, interface 1102 can include a command to add a new access rule (1118) row, save current rules (1120), return to a prior interface window (e.g., device assignment interface 902), provide full access to a physical device (1124), delete all listed rules (1126) and call up help files (1128) associated with utilizing interface 1102.

Figure 12A:
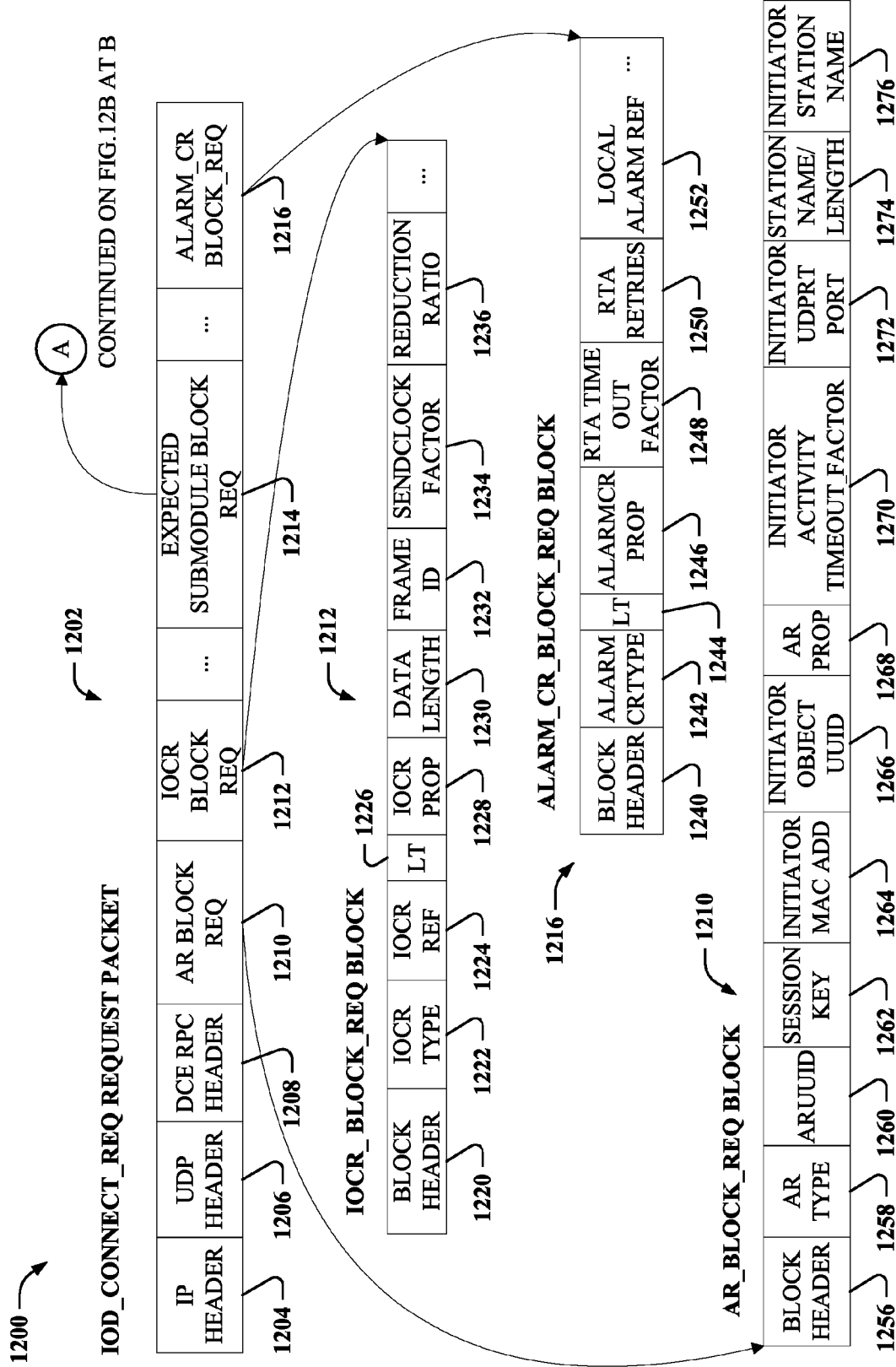
FIGS. 12A and B depict an example communication request data packet and deep packet components in accord with automation control Ethernet-type networks.

FIGS. 12A and B depict an example communication request data packet 1202 and deep packet components in accord with automation control Ethernet-type networks. Values and/or blocks of an IOD_Connect_Req request packet 1202 (request packet) can be used as signatures for deep packet inspection of subsequent data packets related to request packet 1202 (e.g., subsequent data packets forming a communication session between two devices that was initialized, configured, or the like, by request packet 1202). Request packet 1202 can be configured to initiate a co-operative relationship between two or more devices for the purpose of information exchange and coordination of joint operation. For I/O controllers and I/O devices, as described herein, an application level relationship (AR) can be established prior to communicating I/O data between such devices. More specifically, I/O ARs can facilitate data exchange related to cyclic exchange of output data, optionally as a multi-cast to multiple or all internal automation control devices, cyclic exchange of input data, optional as a multi-cast, cyclic exchange of provider and consumer status information, acyclic data transfer for general purpose data access (e.g., identification, parameterization, diagnosis, and the like), and report and acknowledgement of alarms.

Figure 13A:
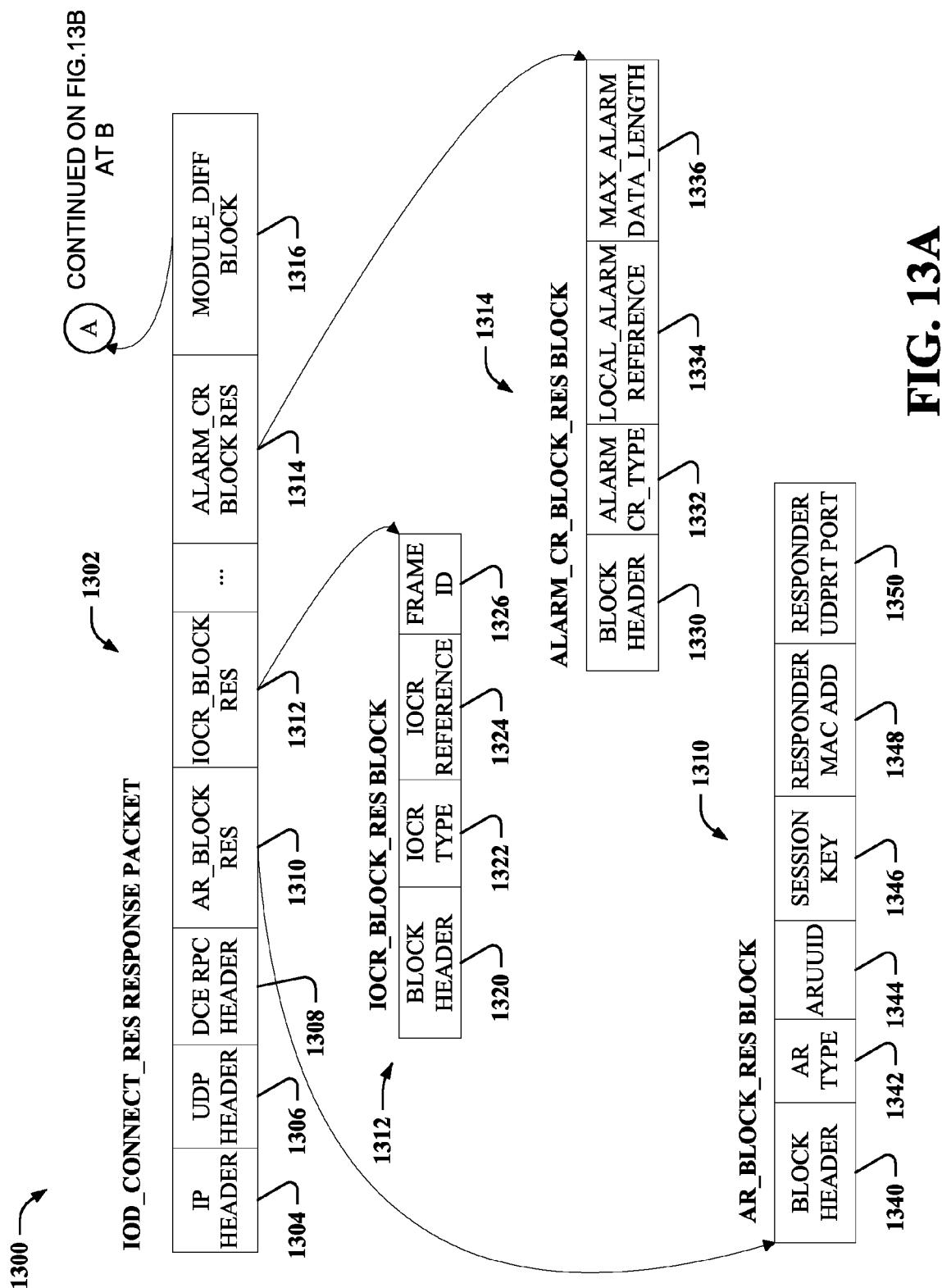
FIGS. 13A and B depict an example communication response data packet and deep packet components in accord with automation control Ethernet-type networks.
Figure 13B:
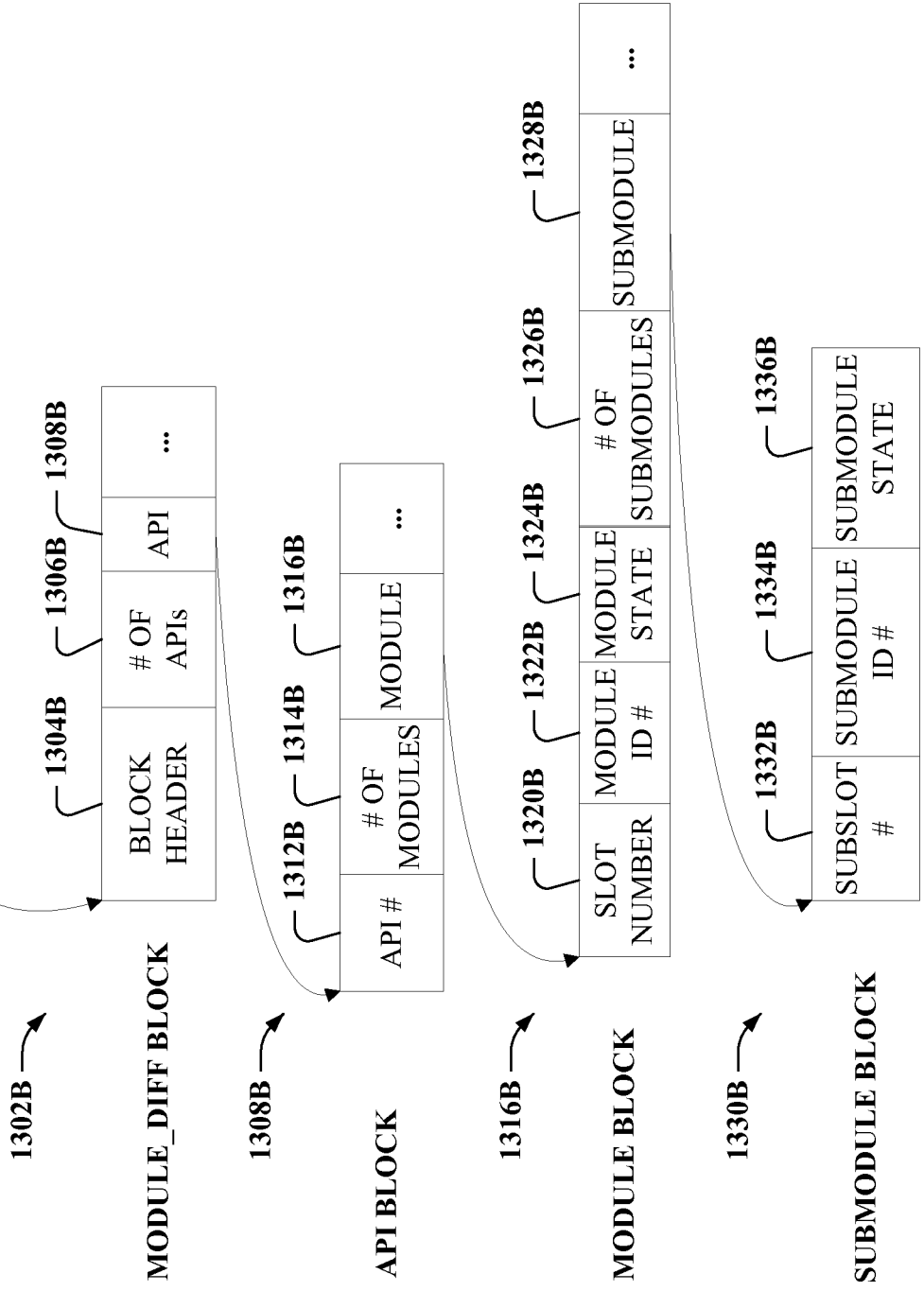

An application relationship established, for instance, by a request packet 1202, can have a predetermined life cycle based on a specified criterion (e.g., time, amount of data to transfer, number of processes to complete, amount of report and/or diagnosis data to be transferred, or the like) or an open-ended life cycle. In general, such relationship will persist during connection establishment, data transfer, and connection release phases. After an application relationship between two or more devices has been established (e.g., by specific portions of request packet 1202, discussed infra), several important values of the specific fields in the connection request (and/or, e.g., in a connection response packet, such as depicted in FIGS. 13A and 13B, infra) packet 1202 can be utilized by components of a firewall (e.g., monitoring components 106 and/or filtering component 108) to determine legitimacy of subsequent packets forming a communication session. Similarly, dynamic stateful packet inspection of data packets relating to supervisor ARs, and, for example, implicit ARs are contemplated.

Request packet 1202 can be based on a connectionless data transfer protocol (e.g., such as distributed computing environment/remote procedure calls DCP/RPC multi-computer distributed software platforms, and in contrast to data exchange packets, for instance, typically requiring a session be established). For example, no prior communication need be established for a real time industrial firewall, as described herein, to apply a security criterion (e.g., created through access rules established with interfaces 802, 902, 1002 and/or 1102, for instance) to request packet 1202, determine its legitimacy, and forward it in or out of an automation control network security zone. In addition, no other communication need be established for suitable transmitting/receiving devices to initiate a communication as specified within request packet 1202.

Request packet 1202 can include header information and several configuration blocks for establishing communication between various I/O devices. Header information, used for routing a packet (1202) within a TCP/UDP/IP environment, can include a typical IP header 1204, UDP header 1206, and DCE/RPC header 1208. Additionally, request packet 1202 can include various communication session establishment blocks including an AR_Block_Req block 1210, one or more I/O communication relationship IOCR_Block_Req blocks 1212, one or more Expected_Submodule_Block_Req blocks 1214 (see FIG. 12B and related discussion, infra, for a more detailed discussion), and an Alarm_CR_Block_Req block 1216.

AR_Block_Req block 1210 can be required to establish an I/O communication. Such block (1210) contains information pertaining to establishing an application relationship between two devices or portions of devices. AR_Block_Req block 1210 can be sub-divided into a block header 1256, containing typical header information relating to the AR_Block_Req block 1210 (including, e.g., block length, type, value, etc.). AR type 1258 can indicate a type of application to be established. ARUUID 1260 can be used to identify an application relationship in a request packet and subsequent data and termination packets. It can typically be at least one piece of information utilized as a signature for deep packet inspection of subsequent data packets transmitted in accord with the application relationship. More specifically, ARUUID 1260 can contain data indicating an application identifier that can associate a packet with a particular session at an application level. AR_Block_Req block 1210 can further include a session key 1262 indicating association with a communication session, an initiator MAC address 1264, an initiator object UUID 1266, AR properties 1268, Initiatior_Activity_Timeout_Factor 1270, Initiator UDPRT port 1272, station name/length 1274, initiator station name 1276, all of which can be pertinent to identifying, creating and establishing details for a particular communication with two or more particular automation control network devices.

IOCR_Block_Req block 1212 can be utilized to establish cyclic I/O communication and data exchange. It can further include a block header 1220, an I/O communication relationship (IOCR) type 1222, an IOCR reference 1224, an LT 1226 block specifying length and type associated with the block (1212), IOCR properties 1228, data length block 1230, a Frame_ID 1232, a sendclock factor 1234, and reduction ratio 1236 blocks. Alarm_CR_Block_Req block 1216 can be utilized to establish acyclic alarm/diagnostic communication channels. A typical Alarm_CR_Block_Req block 1216 can include a block header 1240, an Alarm CRType 1242, an LT block 1244 specifying length and type associated with the block (1216), an AlarmCR properties block 1246, an RTA timeout factor block 1248, an RTA retries block 1250, and a local alarm reference block 1252.

Figure 12B:
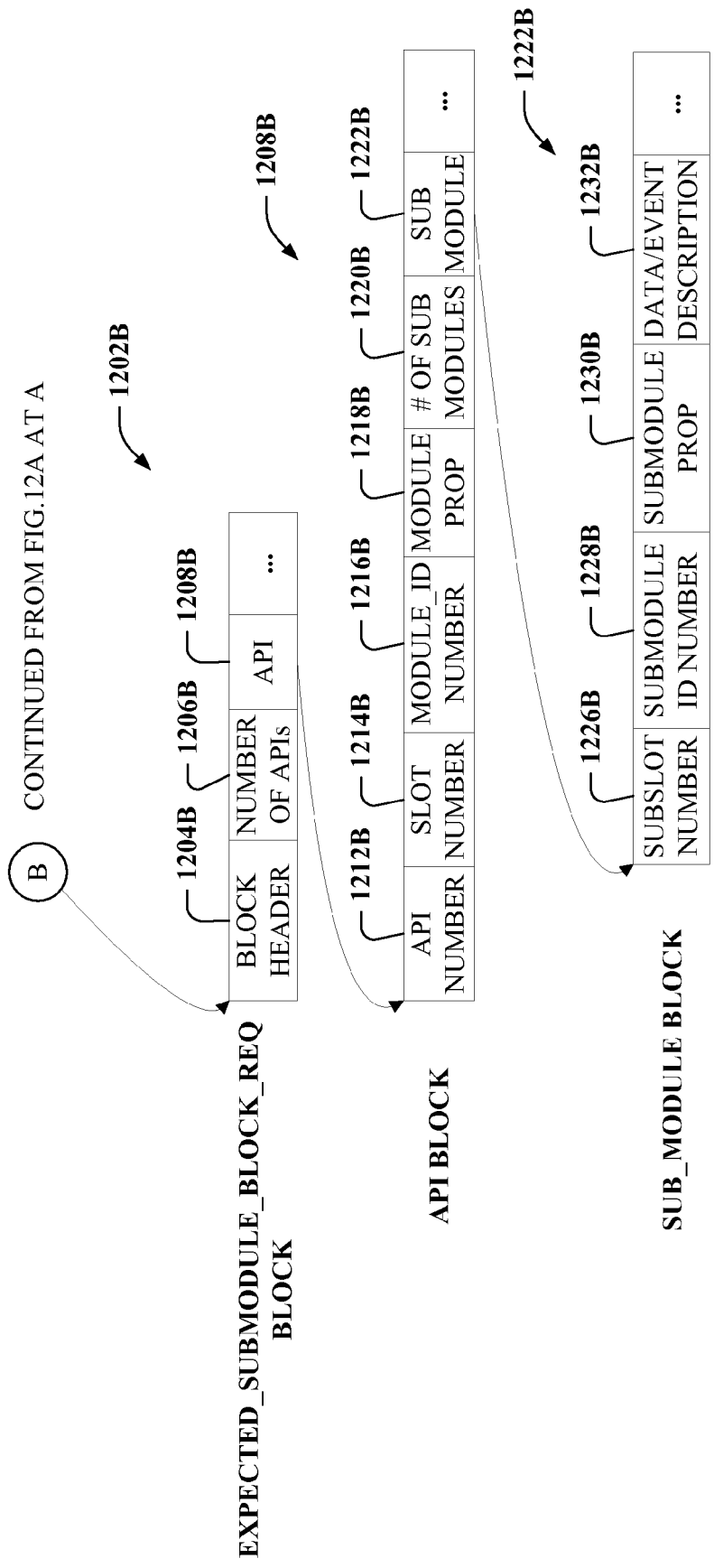

Referring now to FIG. 12B, Expected_Submodule_Block_Req block 1214 is depicted in further detail at 1202B of FIG. 12B. Request block 1202 can include one or more Expected_Submodule_Block_Req blocks 1202B, which can be utilized by a connection initiator device to notify a connection response device of access rights that the initiator device has with respect to modules of the response device for a given application relationship/communication session. Expected_Submodule_Block_Req block 1202B can further include a block header 1204B, a number of API(s) block 1206B, and respective API block(s) 1208B, typically one for each application process indicated by a particular API. An API block 1208B can further include an API number 1212B (see, e.g., API #1006 of FIG. 10), slot number 1214B (e.g., 1008 at FIG. 10), module_ID number 1216B, module property 1218B, number of submodules 1220B, and one or more corresponding submodule block(s) 1222B. Each submodule block, consequently, can include an appropriate subslot number 1226B (see, e.g., subslot #1010 of FIG. 10), submodule_ID number 1228B, submodule property 1230B, and data/event description 1232B (corresponding, e.g., to records and index items specified at 1012 of FIG. 10).

FIGS. 13A and B depict an example communication response data packet 1302 and deep packet components in accord with automation control Ethernet-type networks. More specifically, IOD_Connect_Res response packet 1302 (response packet) can include typical header information for addressing, routing, and the like, as well as payload information to acknowledge a communication request (1202, supra), complete the request, and append any discrepancies thereto. IP header 1304, UDP header 1306 and DCE/RPC header 1308 can be utilized for addressing and routing the packet (1302) in accord with typical TCP/UDP/IP standards. In addition, response packet 1302 can include an AR_Block_Res block 1310, one or more IOCR-Block-Res blocks 1312, an Alarm_CR_Block_Res block 1314, and a module_Diff block 1316 (depicted in more detail at FIG. 13B). The response blocks (1302, 1310, 1312, 1314) acknowledge criteria established by a request packet (1202) for session establishment. The module_Diff block 1316, depicted in more detail at FIG. 13B, can include diagnostic information if a response device determines that configuration data specified in a request packet (1202) is not consistent with response device structure (e.g., the # of modules, slots, subslots, channels, or the like). The module_Diff block 1316 can therefore designate the module ID where a discrepancy occurs and some diagnostic information related to such discrepancy.

AR_Block_Res block 1310 can include a block header 1340, AR type 1342, ARUUID 1344, session key 1346, responder MAC address 1348 and responder UDP RT port 1350 (e.g., in response to an AR_Block_Req block 1210). IOCR_Block_Res block 1312 can include a block header 1320, IOCR Type 1322, IOCR reference 1324, and FrameID 1326. Alarm_CR_Block_Res block 1314 can include a block header 1330, Alarm CR_Type 1332, Local_Alarm reference 1334, and Max_Alarm_Data_Length 1336.

FIG. 13B depicts module_Diff block 1316 in more detail beginning at 1302B. More specifically, module_Diff block 1302B can include a block header 1304B, number of API(s) 1306B, and an API block 1308B for each of the number of APIs specified at 1306B (e.g., 0, 1, or more). An API block 1308B can further include an API number 1312B associated with the API, a # of modules 1314B associated with the API, and one or more module blocks 1316B corresponding to the number of modules 1314B. In addition, a module block 1316B can include a slot number 1320B associated with the module, a module ID number 1322B, a module state 1324B, a number of submodules 1326B, and a submodule block 1328B for each of the number of modules 1326B. Furthermore, each submodule block 1328B can include a subslot number 1332B associated therewith, a submodule ID number 1334B, and a submodule state 1336B.

It should be appreciated fields and/or values specified therein of a communication request packet (1202) and/or response packet (1302) can be utilized as signatures for deep packet inspection of subsequent data packets and/or blocks. Such deep packet inspection can be utilized, for instance, to determine whether subsequent data packets/blocks are legitimate in accord with one or more security criterion (e.g., communication access rules, depicted at FIGS. 8, 9, 10, and 11) as disclosed herein. Values that can be extracted by a firewall for deep packet inspection can include, but are not limited to, initiator MAC address (1264), initiator IP address (contained, e.g., within IP header 1204), ARUUID (1260, 1344), session key (1262, 1346), initiator UDP RT port (1272), initiator alarm reference (1252), responder MAC address (1348), responder IP address (contained, e.g., within IP header 1304), responder UDP RT port (1350), responder alarm reference (1334), input FrameID (read from responder to initiator, 1232), input data update rate (calculated from various data update values specified in request packet 1202 and/or response packet 1302, for instance), output FrameID (1326), output data update rate (calculated in a like fashion as input data update rate, for instance), and one or more of API numbers (1212B, 1312B), slot numbers (1320B, 1214B) and/or module ID numbers (1322B, 1216B), or subslot numbers (1332B, 1226B) and/or submodule ID numbers (1334B, 1228B), and/or various combinations of the foregoing.

It should be appreciated that a real-time industrial firewall as described herein can perform an initial analysis on a request (1202) and/or response (1302) packet (or, e.g., packet pair 1202, 1302) to determine compliance with a security criterion (established, e.g., via access rules 804, 1004, 1104, as specified in FIGS. 8 through 11), and admit or deny propagation of a packet on that basis. Subsequent packets issued as part of an application relationship established by a legitimate request/response packet pair can receive deep packet inspection to verify that they are in accord with the application relationship communication, and admitted on that basis, inspected in accord with the initial security criterion, or both, as applicable to an Ethernet-type network protocol utilized by an automation control network, described herein.

Referring to FIGS. 14-20, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any suitable computer-readable device, carrier, or media.

Figure 14:
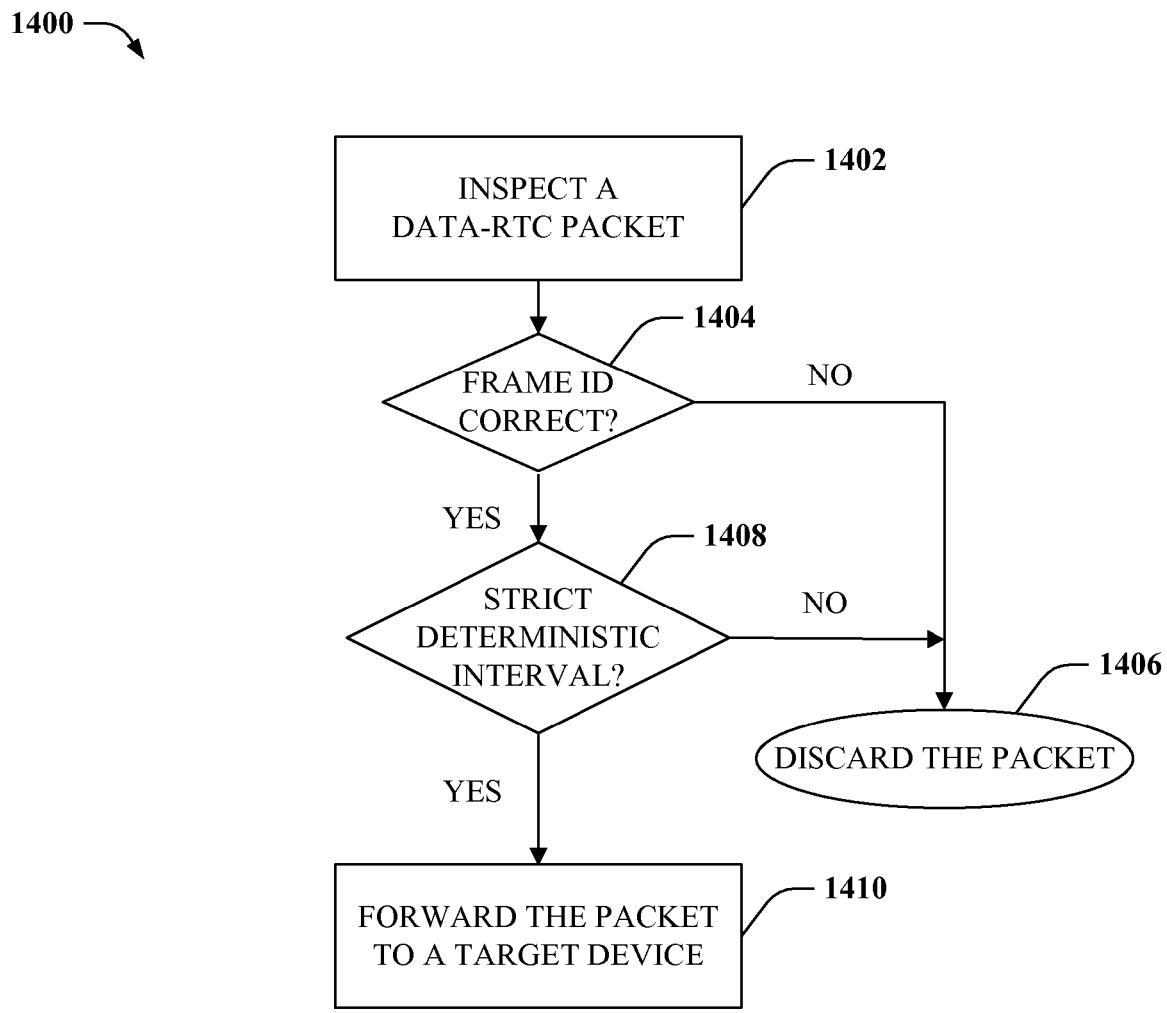
FIG. 14 illustrates an example methodology for verifying authorization of a real-time cyclic data frame (data-RTC) packet in accord with aspects of the claimed subject matter.

FIG. 14 illustrates an example methodology 1400 for verifying authorization of an Ethernet-type real-time cyclic data frame (data-RTC) packet in accord with aspects of the claimed subject matter. At 1402, a data-RTC packet is received and inspected. The data-RTC packet can be based on an IEEE 802.3 Ethernet frame packet, as specified by the IEEE 802.3 standard. More specifically, such data packet can include at least one or more of the following: a destination MAC address, a source MAC address, a type and/or length block describing the data-RTC packet, a frame ID block identifying an application relationship (and related communication, for instance), a cycle counter to determine packet transfer timing, a data status block and a transfer status block. In addition, the data-RTC packet can include unidirectional or bidirectional cyclic I/O data flows.

The data-RTC packet can be issued as part of an application relationship communication specified by a related request/response data packet pair, as described herein (see, e.g., FIGS. 12A, 12B, 13A, 13B). Real time cyclic data flows can have data sent from a responding device to an initiating device called Input Data, and have a corresponding input Frame ID, and data sent from the initiating device to the responding device called Output Data with a corresponding output Frame ID. The inspection can be done by a real-time firewall that can intercept a data packet transmitted to or from an automation control network, as described herein, that compares a frame ID of the packet to input and/or output frame ID(s).

At 1404, a determination is made as to whether a frame ID of the data-RTC packet is correct. Such determination can be in comparison to an input frame ID provided by a responding device, an output frame ID provided by an initiating device, or both. For example, if the frame ID of the data-RTC packet matches the input frame ID, output frame ID, or both, then the determination at 1404 can be that the frame ID is correct. If the frame ID of the data-RTC packet does not match the input or output frame ID, or both, then the determination at 1404 can be that the frame ID is not correct. If the determination at 1404 is that the frame ID is not correct, then the data-RTC packet can be discarded at 1406 (e.g., by a firewall, a filtering component, or the like as described herein).

If the determination at 1404 is that the frame ID of the data-RTC packet is appropriate, then methodology 1400 can proceed to 1408, where another determination can be made as to whether the data-RTC packet was received (e.g., at a real time industrial firewall, at monitoring and filtering components, etc., as described herein) with strict deterministic interval. Strict deterministic interval can be calculated utilizing a cycle_counter data block contained within the data-RTC packet and a related cycle_counter data block specified by a previous or subsequent packet. For example:

Current_Cycle_Counter=cycle counter value of the I/O data packet most recently received.

Last_Cycle_Counter=cycle counter value of the I/O data packet received just prior to the most recently received packet.

Local_Elapsed_Time=time elapsed, as measured by a local clock of a receiving device (e.g., firewall), between receiving the current and prior packets.

According to such definitions, and where Current_Cycle_Counter is >Last_Cycle_Counter, strict deterministic interval is true if the following equation is true:

Strict_Deterministic_Interval=|(Current_Cycle_Counter−Last_Cycle_Counter)*31.25 μs−Local_Elapsed_Time|<β*Input(or Output) Data Update Rate where Input Data Update Rate=SendClockFactor*ReductionRatio*31.25 μs (for data-RTC packets; examples of SendClockFactor and ReductionRatio are depicted at 1234 and 1236, respectively, of FIG. 12A), and where β is a scalar percentage indicating an allowable deviation from input (or output) data update rate. Nominal values can be about 5%, however suitable other values, for example between 1 and 50% or more, can be utilized for β depending on the type of network protocol utilized for the automation control network and typical packet delay.

If, at 1408, the data-RTC packet has arrived with strict deterministic interval (e.g., as specified by the foregoing formula or like formula) then methodology 1400 proceeds to 1410 where the data-RTC packet is forwarded to a target device. If the data-RTC packet has not arrived with strict deterministic interval, the packet is discarded at 1406. It should be appreciated that determinations and processes performed as part of methodology 1400 can be effectuated by a real time industrial firewall as disclosed herein.

Figure 15:
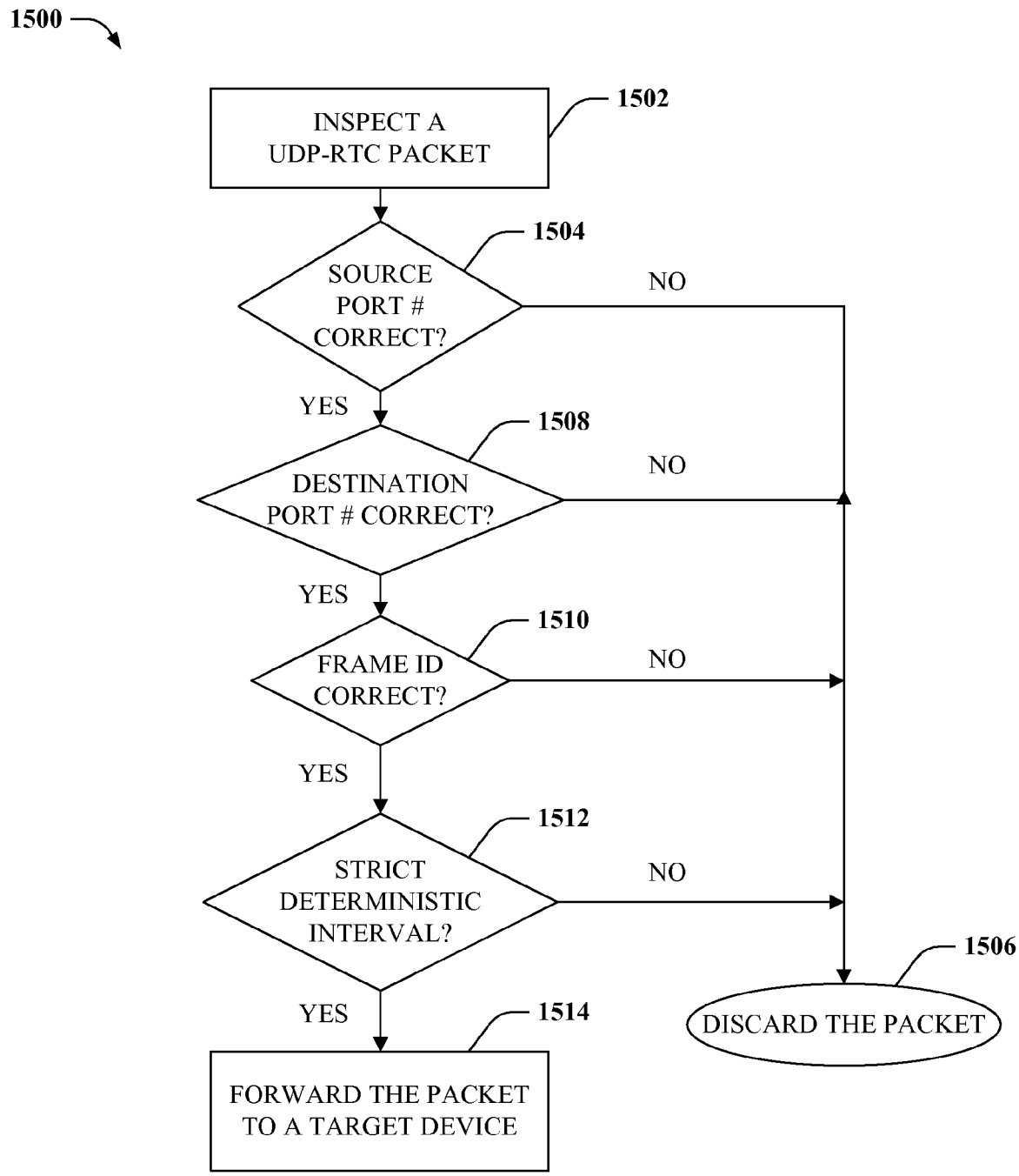
FIG. 15 depicts an example methodology for verifying authorization of an Internet protocol/user datagram protocol (IP/UDP) real-time cyclic (UDP-RTC-PDU) data packet in accord with aspects of the claimed subject matter.

FIG. 15 illustrates an example methodology 1500 for verifying authorization of an Internet protocol/user datagram protocol (IP/UDP) real-time cyclic (UDP-RTC) data packet in accord with aspects of the claimed subject matter. At 1502, a UDP-RTC packet is received and inspected. Such inspection can be, for instance, at a real time industrial firewall as described herein, which can intercept packets transmitted to or from an automation control network or the like. The UDP-RTC packet can include data blocks including at least one or more of the following: an IP header, a UDP header (which further can include at least a source port address number, a destination port number), a frame ID, a cycle_counter, a data status, and a transfer status. At 1504 a determination can be made as to whether a source port number of the UDP-RTC packet is correct (e.g., as compared with a port number specified by a response or request packet, as described herein). If not, methodology 1500 proceeds to 1506 where the UDP-RTC packet is discarded. If the port number is determined to be correct, methodology 1500 instead proceeds to 1508.

At 1508, methodology 1500 determines whether a destination port number of the UDP-RTC packet is correct (e.g., specified by a response or request packet). If the destination port number is correct, methodology 1500 can proceed to 1510, otherwise the UDP-RTC packet is discarded at 1506. At 1510, a determination is made as to whether a frame ID of the UDP-RTC packet is correct (e.g., as described at FIG. 14, supra). If so, methodology 1500 can proceed to 1512, if not, the UDP-RTC packet is discarded at 1506. At 1512, a determination is made as to whether the UDP-RTC packet has been received with strict deterministic interval. Such strict deterministic interval can be substantially similar to that described supra at FIG. 14, except as indicated by the following equations:

Strict_Deterministic_Interval=|(Current_Cycle_Counter−Last_Cycle_Counter)*1000 μs−Local_Elapsed_Time|<β*Input(or Output) Data Update Rate where Input Data Update Rate=SendClockFactor*ReductionRatio*1000 μs If determinations at 1504, 1508, 1510, and 1512 are all determined to be true, methodology 1500 can proceed to 1514. At 1514, the UDP-RTC data packet is forwarded to the target device (e.g., specified within the UDP-RTC packet). It should be appreciated that determinations made by methodology 1500 can be performed by a real time industrial firewall (and/or monitor and filtering components) as described herein. It should be appreciated that determinations and processes performed as part of methodology 1500 can be effectuated by a real time industrial firewall as disclosed herein.

Figure 16:
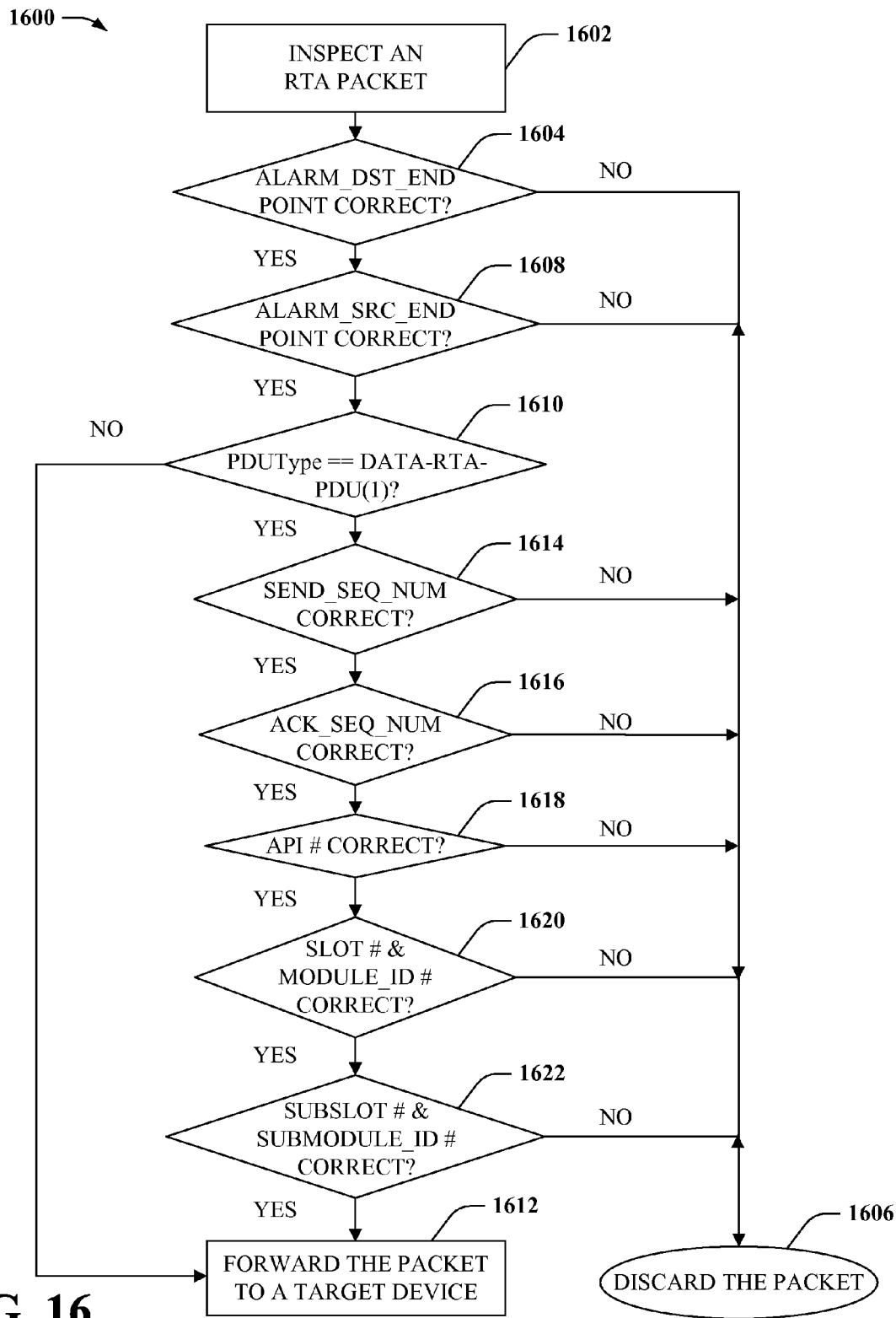
FIG. 16 illustrates a sample methodology for verifying authorization of a real time acyclic (RTA) data packet in accord with aspects of the subject disclosure.

FIG. 16 illustrates a sample methodology for verifying authorization of a real time acyclic (RTA) data packet in accord with aspects of the subject disclosure. At 1602, an RTA data packet is received and inspected (e.g., by a real time industrial firewall and/or monitoring component associated therewith). An RTA packet can be one of at least four types. More specifically, an RTA data packet, containing detailed alarm information and that requires acknowledgment from a receiving device, an RTA NACK packet indicating an incorrectly received RTA data packet, an RTA ACK packet indicating a properly received RTA data packet, and an RTA ERR packet indicating a high or low priority error alarm.

The RTA data packet can include data blocks specifying at least one or more of the following: destination MAC address, source MAC address, type and length associated with the data packet, a frame ID, and an RTA packet data unit (PDU) block. Additionally, the RTA PDU block can further include at least an alarm destination endpoint, an alarm source endpoint, a PDU type, a send sequence number, an acknowledge sequence number, and an RTA sequence data unit (SDU). Moreover, the RTA SDU can further include at least an API number, a slot number, a module ID number, a subslot number, and a submodule ID number.

At 1604, a determination can be made as to whether the alarm destination endpoint specified by the RTA packet is correct (e.g., as compared with an alarm destination endpoint specified by a request and/or response packet as described herein). If the alarm destination endpoint is incorrect, the RTA packet can be discarded at 1606. If the RTA packet is correct, methodology 1600 proceeds to 1608 where a determination is made as to whether the alarm source endpoint is correct. If so, methodology 1600 proceeds to 1610, if not the data packet is discarded at 1606. At 1610, the PDU type is inspected to determine whether it is a Data RTA-PDU type. If not, methodology 1600 proceeds to 1612 where the data packet is forwarded to a target device. If the RTA packet is an RTA Data packet, methodology 1600 proceeds to 1614 to determine whether the send sequence number is correct.

Figure 17:
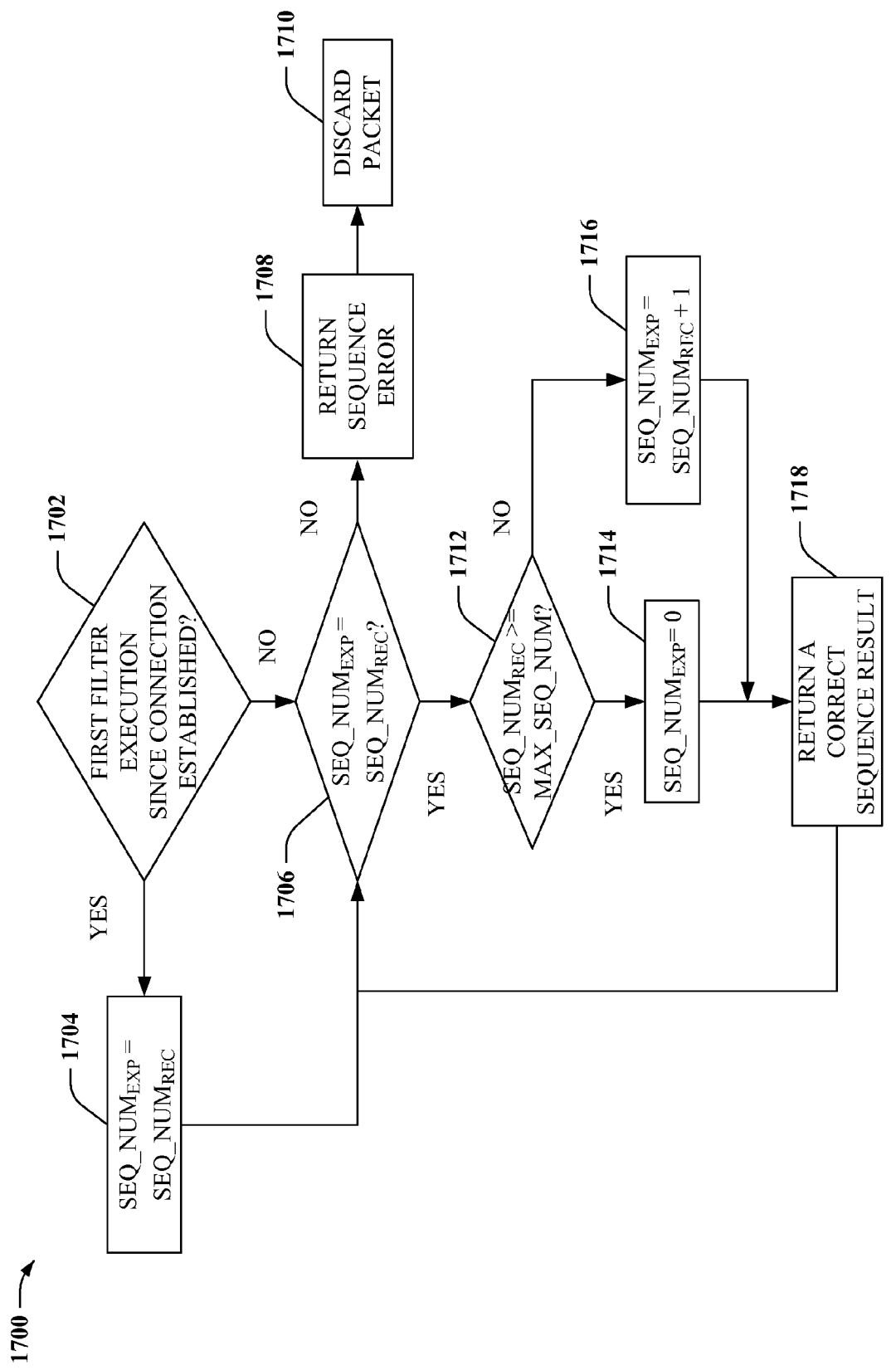
FIG. 17 depicts an example methodology for verifying a sequence number(s) of an RTA packet in accord with various aspects described herein.

A send sequence number(s) of an acyclic data packet can be stored upon receipt (e.g., by a firewall as described herein) and utilized to check whether subsequent acyclic data packets are correct (e.g., see FIG. 17 infra for an example methodology to determine whether a sequence number of an acyclic data packet is legitimate). If the send sequence number is not correct, the RTA packet is discarded at 1606. If the send sequence number is determined to be correct, methodology 1600 can proceed to 1616, where a determination can be made as to whether an acknowledge sequence number is correct (e.g., in a manner substantially similar to that detailed above for a send sequence number, or as detailed in FIG. 17 infra). If the acknowledge sequence number is determined to be incorrect, the RTA packet is discarded at 1606. If the number is determined correct, methodology 1600 continues at 1618.

At 1618, a determination can be made as to whether the API number specified in the API number block is correct (e.g., as compared to an API number extracted from a response and/or request packet 1202, 1302, for instance). If incorrect, the RTA packet can be discarded at 1606, if correct methodology 1600 can proceed to 1620. At 1620, a slot number and module ID number are checked to determine whether they are correct (e.g., compared with respective values specified in a response and/or request packet as described supra). If the slot number and/or module ID number are correct, methodology 1600 can proceed to 1622; if incorrect the data packet can be discarded at 1606. At 1622 a subslot number and a submodule ID number can be checked for correctness. If the subslot and/or submodule ID numbers are correct, the RTA packet can be forwarded to a target device at 1612. If the subslot and submodule ID numbers are incorrect (e.g., as compared with values indicated in a response and/or request packet(s) 1202, 1302), the RTA packet can be discarded at 1606. It should be appreciated that determinations and processes performed as part of methodology 1600 can be effectuated by a real time industrial firewall as disclosed herein.

FIG. 17 depicts an example methodology 1700 for verifying a sequence number(s) of an RTA packet in accord with various aspects described herein. As depicted at FIG. 17, Seq_Num$_{EXP}$=an expected sequence number contained in a next incoming data packet to be received. Seq_Num$_{REC}$=a sequence number contained in a most recently received data packet. Max_Seq_Num=a maximum allowed sequence number defined by a protocol specification, such as a 0x7FFF number. At 1702, a determination as made as to whether a sequence execution is the first such execution for a given connection. If the execution is the first such execution, methodology 1700 proceeds to 1704. If a prior sequence execution has occurred for the given connection, methodology 1700 proceeds to 1706. At 1704, Seq_Num$_{EXP}$ is set to be equal to Seq_Num$_{REC}$, and methodology 1700 can proceed to 1706.

At 1706, a determination is made as to whether Seq_Num$_{EXP}$ is equal to Seq_Num$_{REC}$. If Seq_Num$_{EXP}$ is determined not to be equal to Seq_Num$_{REC}$, methodology 1700 can proceed to 1708 where a sequence number error result is returned to an initiating function and/or device (e.g., at 1614, 1616, 1804, etc.) and to 1710 where a data packet containing the sequence number can be discarded (e.g., by a firewall as described herein). If the determination at 1706 is that Seq_Num$_{EXP}$ is equal to Seq_Num$_{REC}$, methodology 1700 proceeds to 1712 where a determination is made as to whether Sec_Num$_{REC}$ is greater than or equal to Max_Seq_Num. If Seq_Num$_{REC}$ is greater than or equal to Max_Seq_Num, then methodology 1700 can proceed to 1714 where Seq_Num$_{EXP}$ can be set to zero, e.g., in preparation for a next incoming data packet corresponding to a particular connection. If Seq_Num$_{REC}$ is less than Max_Seq_Num, methodology 1700 proceeds to 1716 where Seq_Num$_{EXP}$ is set equal to Se_Num$_{REC}$+1, e.g., in preparation for a next incoming data packet corresponding to a particular connection.

At 1718, methodology 1700 can return a correct sequence result to an initiation function and/or device (e.g., at 1614, 1616, 1804, etc.). Subsequently, methodology 1700 can proceed to reference number 1706 to receive a later incoming data packet and verify a sequence number and connection associated with such incoming data packet. It should be appreciated that determinations and processes performed as part of methodology 1700 can be effectuated by a real time industrial firewall as disclosed herein.

Figure 18:
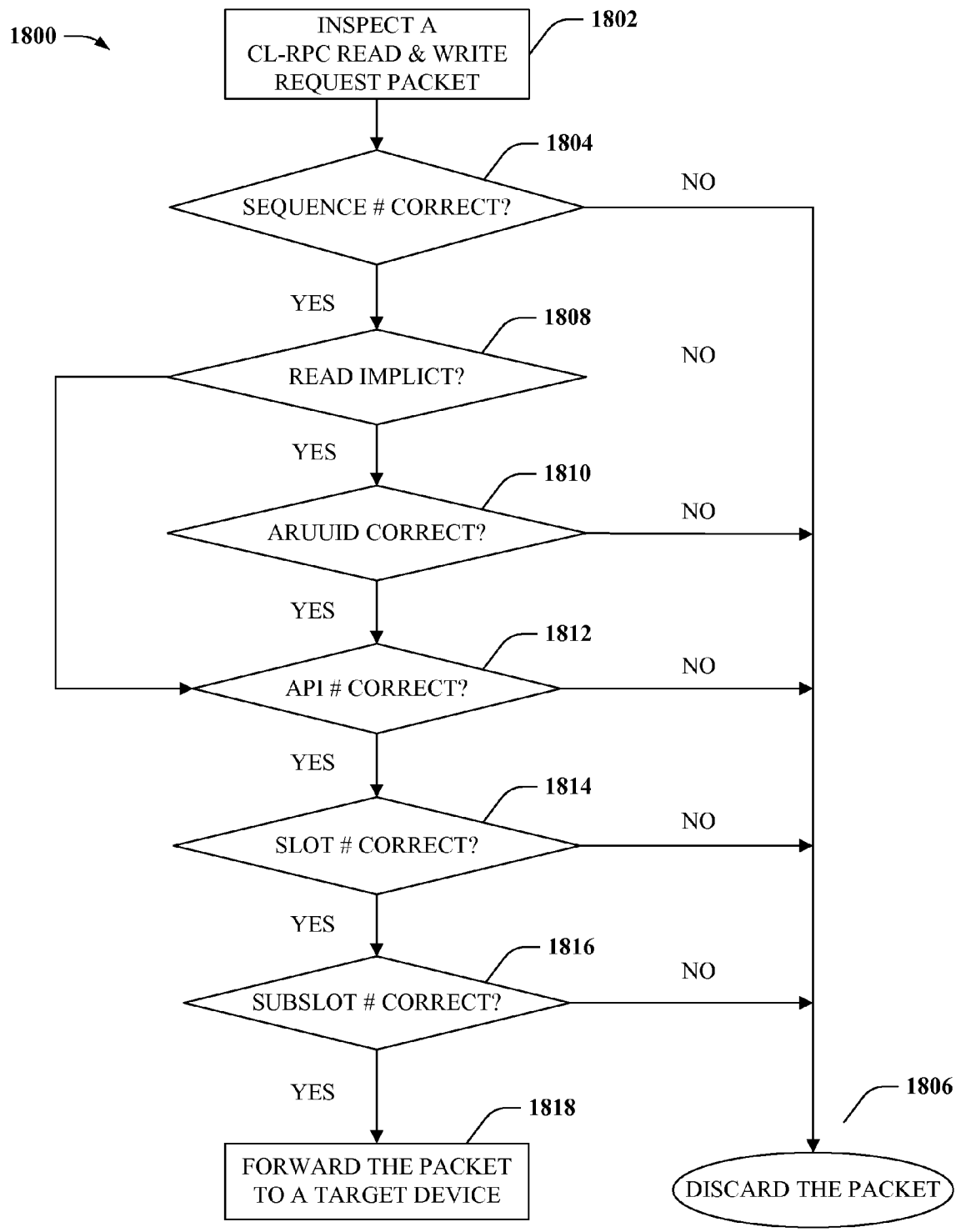
FIG. 18 illustrates an exemplary methodology for verifying authorization of a connectionless remote procedure call (CL-RPC) read and write request packet in accord with aspects described herein.

FIG. 18 illustrates an exemplary methodology for verifying authorization of a connectionless remote procedure call (CL-RPC) read and write request packet in accord with aspects described herein. The CL-RPC read and write request packet can contain at least one or more of the following data blocks: an IP header, UDP header, DCE RPC header, sequence number, ARUUID number, API number, slot number, and a subslot number. At 1802, a CL-RPC read and write request packet is received and inspected. At 1804, a determination is made as to whether a sequence number is correct (e.g., as specified at FIG. 17, supra). If the sequence number is not correct, methodology 1800 proceeds to 1806 where the CL-RPC data packet is terminated. If the sequence number is correct, methodology 1800 can proceed to 1808.

At 1808, a determination is made as to whether the CL-RPC read and write request packet is a read implicit packet. If yes, methodology 1800 can proceed to 1812, if not, methodology 1800 can proceed to 1810. At 1810, a determination is made as to whether an ARUUID number specified by the CL-RPC data packet is correct (e.g., compared to an ARUUID number extracted from a response and/or request data packet 1302, 1202, and stored in memory at a firewall). If the ARUUID number is incorrect, the CL-RPC data packet can be discarded at 1806, if it is correct, methodology 1800 can proceed to 1812.

At 1812, a determination is made as to whether an API number is correct; if incorrect, the data packet can be discarded at 1806, if correct methodology 1800 can proceed to 1814. At 1814, a determination is made as to whether a slot number is correct; if incorrect the data packet can be discarded at 1806, if correct methodology 1800 can proceed to 1816. At 1816, a determination is made as to whether a subslot number is correct; if incorrect the data packet can be discarded at 1806, if correct then methodology 1800 can proceed to 1818 where the data packet is forwarded to a target device. It should be appreciated that determinations and processes performed as part of methodology 1800 can be effectuated by a real time industrial firewall as disclosed herein.

Figure 19:
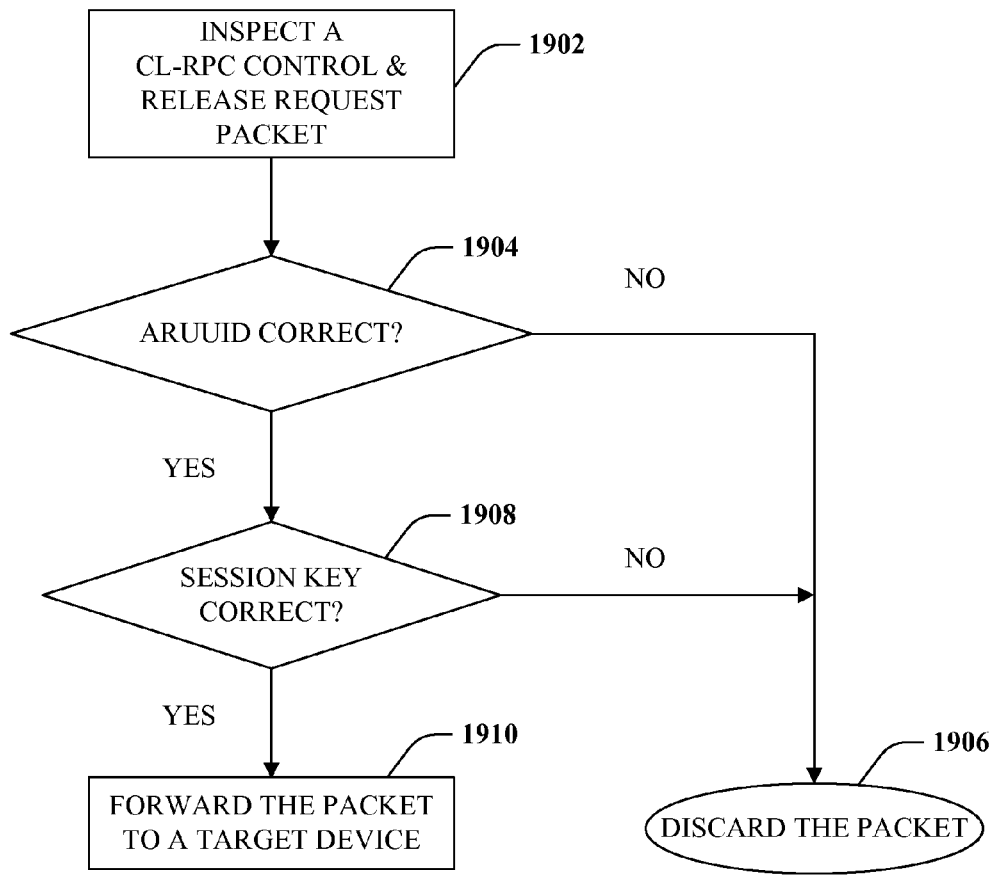
FIG. 19 illustrates an exemplary methodology for verifying authorization of a CL-RPC control and release request packet in accord with aspects of the claimed subject matter.

FIG. 19 illustrates an exemplary methodology 1900 for verifying authorization of a CL-RPC control and release request packet in accord with aspects of the claimed subject matter. The CL-RPC control and release request packet can contain at least one or more of the following data blocks: an IP header, a UDP header, an ARUUID block, and a session key. At 1902 a CL-RPC release and request packet is received and inspected. At 1904, a determination is made as to whether the ARUUID number is correct (e.g., as compared to an ARUUID specified in a response and/or request packet 1302, 1202); if incorrect the CL-RPC data packet can be discarded at 1906, if correct methodology 1900 can proceed to 1908. At 1908, a determination is made as to whether the session key is correct; if incorrect the CL-RPC data packet can be discarded at 1906, if correct methodology 1900 can proceed to 1910 where the data packet is forwarded to a target device. It should be appreciated that determinations and processes performed as part of methodology 1800 can be effectuated by a real time industrial firewall as disclosed herein.

Figure 20:
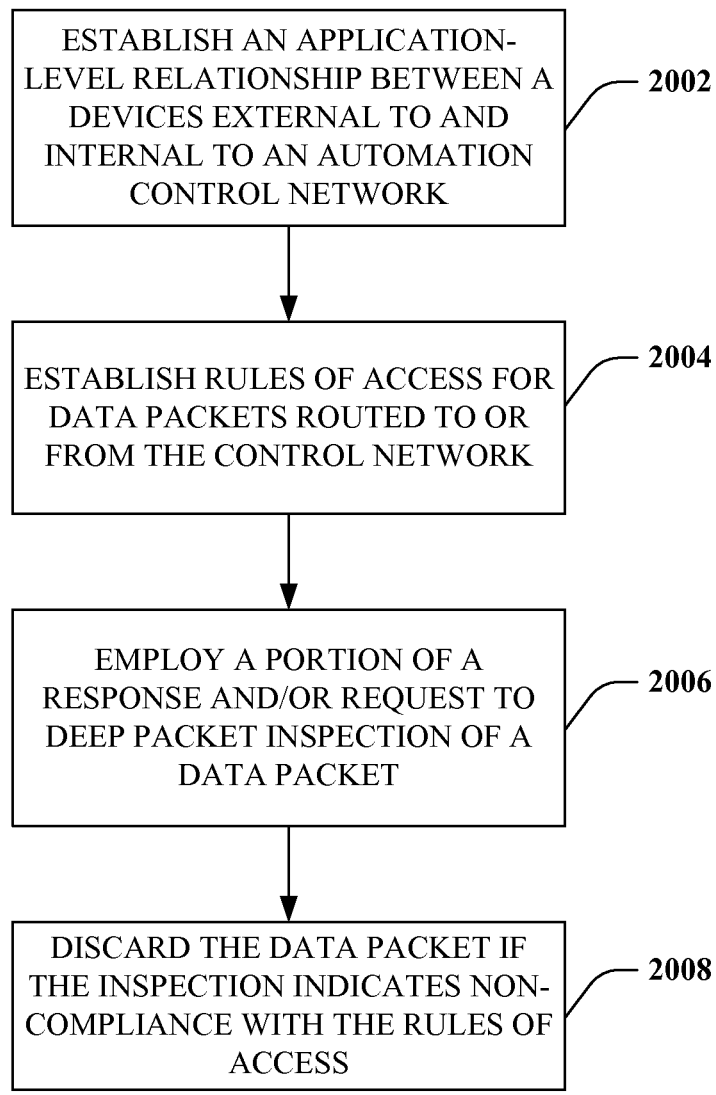
FIG. 20 depicts a sample methodology for employing an Industrial Firewall to implement application-level communication security between components of an automation control network and exterior components in accordance with aspects of the subject innovation.

FIG. 20 depicts a sample methodology for employing an Industrial Firewall to implement application-level communication security between components of an automation control network and exterior components in accordance with aspects of the subject innovation. At 2002, an application-level relationship can be established between a device external to and a device internal to an automation control network. The relationship can be established as part of a security criterion identifying the internal and external devices permitted to communicate and a permissible direction of communication, for instance. At 2004, rules of access in accord with the application level relationship can be established for data packets of the internal and external device(s) routed to or from the control network. Such rules of access can indicate permissible access from one device to one or more other automation devices, APIs, modules, submodules, index records, logical devices, RT-Autos, or data/events or combinations thereof. At 2006, a portion of a communication initiation response and/or request related to the application relationship can be employed to perform a deep packet inspection on a received data packet. At 2008, the received data packet can be discarded if the inspection indicates non-compliance with the rules of access.

Figure 21:
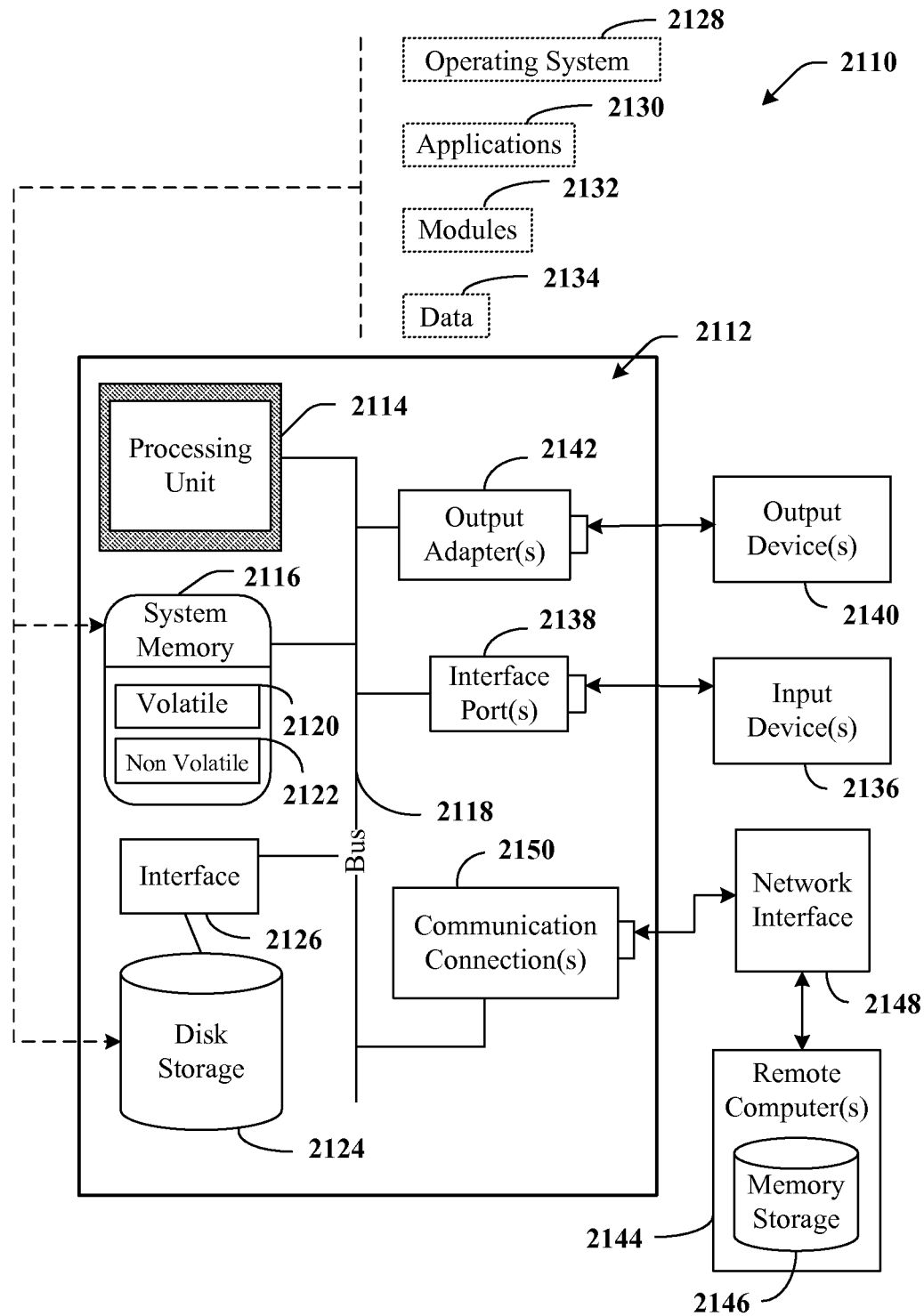
FIG. 21 illustrates an example operating environment that can implement various processes and communications in conjunction with securing communication with an automation control network as disclosed herein.

FIG. 21 illustrates an example operating environment that can implement various processes and communications in conjunction with securing communication with an automation control network as disclosed herein. Computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media, for example disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that the subject invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to provide output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

Figure 22:
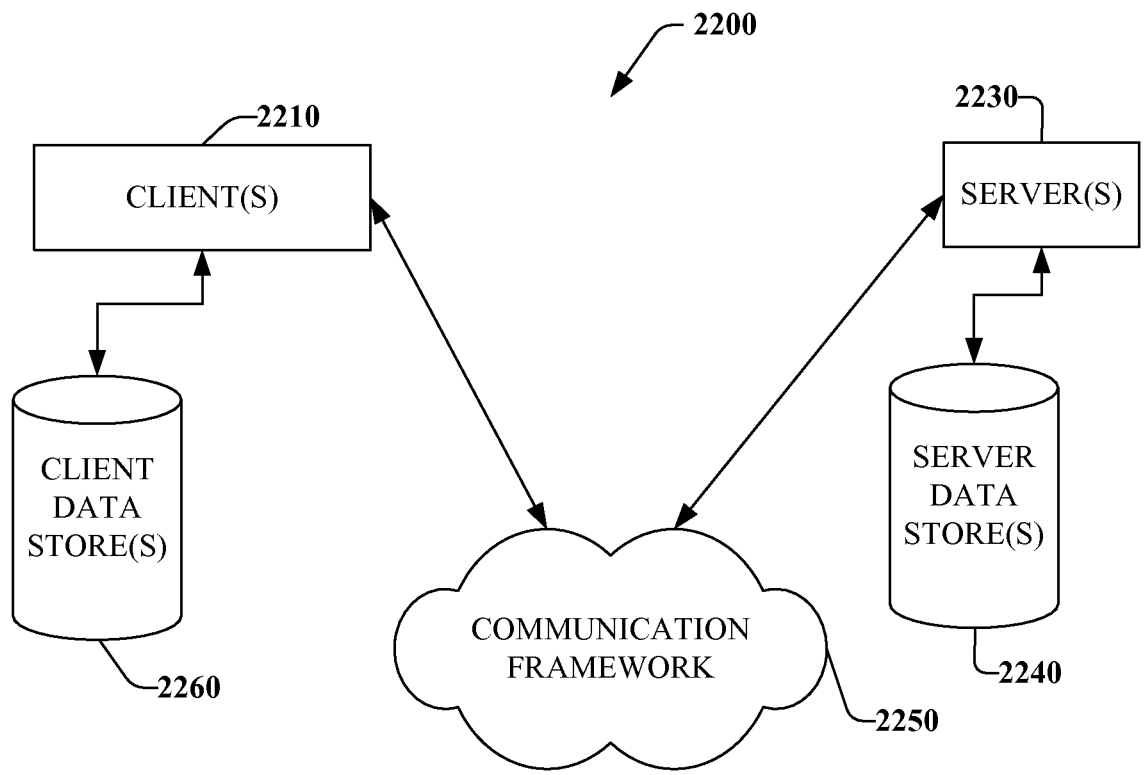
FIG. 22 depicts an example networking environment that can be utilized to effectuate remote communication in accord with additional aspects of the claimed subject matter.

FIG. 22 is a schematic block diagram of a sample-computing environment 2200 with which the subject invention can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing the subject invention, for example. One possible communication between a client 2210 and a server 2230 can be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory configured to store computer-executable components;
   a processor, communicatively coupled to the memory, configured to execute or facilitate execution of the computer-executable components, the computer-executable components comprising:
   an identification component configured to determine disparate functions represented at disparate tiers of a tiered command structure and performed by an industrial device of an industrial automation network based on topological structure data associated with a composition of the industrial device that is specified by an industrial automation protocol employed by the industrial automation network, wherein the topological structure data comprises hierarchical structure information related to the disparate functions; and
   a device assignment interface configured to determine, based on information extracted from a received communication request protocol message, one or more access rules employed to independently restrict access to the disparate functions by a specified device that is external to the industrial automation network.

2. The system of claim 1, wherein the computer-executable components further comprise:
   a monitoring component configured to inspect at least a portion of communication data transmitted between the industrial device and the specified device to determine a function of the disparate functions that is to be accessed via the communication data.

3. The system of claim 2, wherein the computer-executable components further comprise:
   a filtering component configured to selectively admit a propagation of the communication data in response to the communication data being determined to satisfy a set of the one or more access rules associated with the function.

4. The system of claim 1, wherein the industrial automation protocol comprises an industrial Ethernet-related communication protocol that comprises a component-based automation protocol.

5. The system of claim 2, wherein the computer-executable components further comprise:
   a communication security component that is configured to receive the communication request protocol message that is utilized to establish, prior to receiving the communication data, an application-level relationship between the industrial device and the specified device, wherein the one or more access rules are determined in accordance with the application-level relationship.

6. The system of claim 5, wherein the application-level relationship facilitates a secure transmission of cyclic data from the industrial device to the specified device.

7. The system of claim 5, wherein the communication request protocol message comprises initiator information indicative of a device, selected from the industrial device and the specified device, that is authorized to initiate a communication between the industrial device and the specified device.

8. The system of claim 2, further comprising:
   a mapping component configured to correlate at least one of addressing, routing or control information to a device name of the industrial device, and facilitate routing, inspection, and selective propagation of the communication data based on the device name.

9. The system of claim 3, wherein the filtering component is further configured to deny the propagation of the communication data in response to the communication data being determined to fail to satisfy the set of the one or more access rules.

10. The system of claim 1, further comprising:
    a replication component configured to act as a communication proxy on behalf of one or more components of the industrial automation network for communication with the specified device.

11. The system of claim 1, wherein the identification component is further configured to determine the topological structure data based on a hardware configuration file that is received from a network configuration device associated with the industrial automation network.

12. A non-transitory computer readable storage medium comprising computer-executable instructions that, in response to execution, cause a system comprising a processor to perform operations, comprising:
    based on a topological structure data associated with a composition of the industrial device that is specified by an industrial automation protocol employed by an automation control network, determining a tiered command structure that represents, at disparate tiers, disparate functions performed by an industrial device, wherein the topological structure comprises hierarchical structure information related to the disparate functions; and
    based on information extracted from a communication protocol data packet, assigning respective access criteria to the disparate functions to independently control access of the disparate functions by a device coupled to a network that is external to the automation control network.

13. The non-transitory computer readable storage medium of claim 12, wherein the operations further comprise:
    based on inspecting at least a portion of communication data that is to be transmitted between the industrial device and the device, determining a function of the disparate functions to be accessed via the communication data; and prohibiting a transfer of the communication data in response to the communication data being determined to fail to satisfy an access criterion of the respective access criteria associated with the function.

14. The non-transitory computer readable storage medium of claim 13, wherein the inspecting comprises analyzing a data packet directed to the industrial device for information indicative of a transmitting device, and prohibiting comprises terminating the data packet, in response to the transmitting device not being authorized by the access criterion to initiate a communication associated with the function.

15. The non-transitory computer readable storage medium of claim 13, wherein the operations further comprise:

allowing the transfer of the communication data in response to the communication data being determined to satisfy the access criteria.

16. The non-transitory computer readable storage medium of claim 12, the tiered command structure further comprises information indicative of at least one of an application programming interface number, a slot number, a sub-slot number, index number, a real-time auto name, data name, or an event name associated with the industrial device.

17. A method, comprising:

determining, by a system comprising a processor, topological structure data that is indicative of different functions represented at disparate tiers of a tiered command structure and performed by a first device of an industrial automation network, wherein the topological structure data comprises hierarchical structure information related to the different functions that is specified by an industrial automation protocol utilized by the industrial automation network; and based on respective access criteria assigned to the different functions, independently controlling access of the different functions by a second device external to the industrial automation network, wherein the respective access criteria is determined based on information extracted from a received communication protocol data packet.

18. The method of claim 17, further comprising:

based on the information, facilitating an establishment of an application-level relationship between the first device and the second device, wherein the access criteria is determined in accordance with the application-level relationship.

19. The method of claim 17, wherein the independently controlling comprises utilizing the information as a signature for packet inspection, comprising utilizing at least one of a user datagram protocol real-time port, an alarm reference of an initiating or responding device or process, an application-level relationship identifier, a session key, an input frame identifier or data update rate, an output frame identifier or data update rate, an application process identifier number, an application process identifier slot number, an application process identifier subslot number, a physical device name, a logical device name, an real time-auto name, a data name, or an event name as the signature for packet inspection.

20. The method of claim 17, wherein the determining the topological structure data comprises determining the topological structure data based on at least one of a hardware description file of the first device in a generic station description markup language or a hardware configuration file received from a network configuration device.

21. A non-transitory device-readable storage medium comprising device-executable instructions that, in response to execution, cause a system comprising a processor, to perform operations, comprising:

determining, based on information extracted from a received communication protocol data packet, respective access rights that are to be assigned to different functions performed via an industrial device within an industrial automation network, wherein the different functions are determined based on hierarchical structure data of the industrial device that represents the different functions at different tiers of a tiered command structure specified by an industrial automation protocol employed by the industrial automation network; and based on the access rights, independently controlling access to the different functions by a device external to the industrial automation network.

22. The non-transitory device-readable storage medium of claim 21, wherein the operations further comprise:

receiving the hierarchical structure data from a network configuration device.

23. The non-transitory device-readable storage medium of claim 21, wherein the operations further comprise:

based on the information, determining signature data to be employed for inspection of a subsequent data packet that is transmitted between the industrial device and the device, wherein the signature data comprises at least one of a user datagram protocol real-time port, or an alarm reference of an initiating or responding device or process, an application-level relationship identifier, a session key, an input frame identifier, a data update rate, an output frame identifier, data update rate, an application process identifier number, an application process identifier slot number, an application process identifier subslot number, a physical device name, a logical device name, a real time-auto name, a data name, or an event name.

24. The non-transitory device-readable storage medium of claim 23, wherein the operations further comprise:

determining that the subsequent data packet is illegitimate in response to the subsequent data packet not being received at least one of within a predefined interval or with a specific sequence number as specified within the access rights.

* * * * *